US012394266B2

(12) United States Patent
Axtolis et al.

(10) Patent No.: US 12,394,266 B2
(45) Date of Patent: Aug. 19, 2025

(54) METHOD AND SYSTEM FOR A CHANGING CODE LEARNING TRANSMITTER

(71) Applicant: The Chamberlain Group LLC, Oak Brook, IL (US)

(72) Inventors: Robert Jude Axtolis, Naperville, IL (US); Oddy Khamharn, Lombard, IL (US); Edward James Lukas, Batavia, IL (US); Cavin Robert McKinley, St. Charles, IL (US); Jay Edward Peterson, Westmont, IL (US); Adelaide Zhang, Northbrook, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 81 days.

(21) Appl. No.: 18/533,934

(22) Filed: Dec. 8, 2023

(65) Prior Publication Data

US 2024/0104988 A1 Mar. 28, 2024

Related U.S. Application Data

(63) Continuation of application No. PCT/US2022/032947, filed on Jun. 10, 2022.

(60) Provisional application No. 63/209,625, filed on Jun. 11, 2021.

(51) Int. Cl.
*G07C 9/00* (2020.01)

(52) U.S. Cl.
CPC ..... *G07C 9/00857* (2013.01); *G07C 9/00309* (2013.01); *G07C 9/00896* (2013.01); *G07C 2009/00388* (2013.01); *G07C 2009/00888* (2013.01); *G07C 2009/00928* (2013.01)

(58) Field of Classification Search
None
See application file for complete search history.

(56) References Cited

U.S. PATENT DOCUMENTS

| | | | | |
|---|---|---|---|---|
| 5,699,055 | A | 12/1997 | Dykema et al. | |
| 10,652,743 | B2 * | 5/2020 | Fitzgibbon | H04W 12/06 |
| 2011/0205014 | A1 | 8/2011 | Fitzgibbon | |
| 2013/0063243 | A1 | 3/2013 | Witkowski et al. | |
| 2015/0228132 | A1 | 8/2015 | Geerlings et al. | |

(Continued)

OTHER PUBLICATIONS

International Search Report and Written Opinion of the ISA/AU, mailed Oct. 13, 2022, in PCT Application No. PCT/US2022/032947, 11 pages.

*Primary Examiner* — K. Wong
(74) *Attorney, Agent, or Firm* — Foley IP Law, PLLC

(57) ABSTRACT

In one aspect, a method is provided of effecting secure communications for a movable barrier operator and a trainable transmitter. The method includes, at the movable barrier operator, transmitting to a remote control a first radio frequency communication via a first communication protocol wherein the first radio frequency communication includes an access code. The method further includes receiving from the trainable transmitter a second radio frequency communication via a second communication protocol. The second radio frequency communication includes a derived access code based at least in part upon the access code. The method further includes learning the trainable transmitter in response to the derived access code corresponding to the access code.

20 Claims, 17 Drawing Sheets

(56) References Cited

U.S. PATENT DOCUMENTS

| | | | |
|---|---|---|---|
| 2015/0302738 | A1 | 10/2015 | Geerlings et al. |
| 2019/0200225 | A1 | 6/2019 | Fitzgibbon |

* cited by examiner

METHOD AND SYSTEM FOR A CHANGING CODE LEARNING TRANSMITTER

CROSS-REFERENCE TO RELATED APPLICATION

This application is a continuation of PCT Application No. PCT/US2022/032947, filed Jun. 10, 2022, which claims the benefit of U.S. Provisional Application No. 63/209,625, filed Jun. 11, 2021. The disclosures of which are hereby incorporated by reference in their entirety.

FIELD

This disclosure relates to movable barrier operators and, more particularly, to learning new security codes to movable barrier operators.

BACKGROUND

A movable barrier operator system usually includes a movable barrier operator, such as a garage door operator, and a remote control, such as a transmitter. The transmitter transmits a radio frequency (RF) signal including an access code that is received by the movable barrier operator. If the movable barrier operator authenticates the access code, the movable barrier operator performs the requested action such as changing the state (e.g., open/closed) of a movable barrier.

Access codes may include changing codes, such as rolling codes, that change with each operation of the transmitter. The transmitter and the movable barrier operator both use a similar algorithm to predict the next access code to be sent and received.

One type of access code includes four codes, such as a fixed transmitter number identification or code, a rolling code, a fixed transmitter type identification code, and a fixed switch identification code. The fixed transmitter identification code is a substantially unique transmitter identification number for the transmitter such as a universally unique identification (UUID) or globally unique identifier (GUID). The rolling code is a code that changes every transmission in order to confirm that the transmission is not a recorded and replayed transmission. The type identification code of the access code is used to notify the movable barrier operator of the type and features of the transmitter. The switch identification code is used to identify which switch on the transmitter (e.g. if the transmitter is configured with more than one switch/button) is being pressed.

In the garage door operator context, a user typically receives at least one trained transmitter when the garage door opener is purchased and/or installed. The trained transmitter was previously learned by the garage door opener, so that the user may press a button of the transmitter to cause the transmitter to transmit RF signal including an access code to the garage door opener and open the garage door.

"Learning" transmitters, also known as "universal" transmitters, are known that are configured to be learned by a garage door opener as a replacement for, or in addition to, the trained transmitters. Learning transmitters include in-vehicle learning transmitters such as those integrated in the dashboard, visor, or rearview mirror of the vehicle. One such learning transmitter is a HomeLink® device or system.

Various approaches are currently used to train a garage door operator to respond to a RF signal from a learning transmitter of a vehicle. In one approach, the user places the vehicle learning transmitter into a mode to listen for a RF signal from a trained transmitter. The user presses a button of the trained transmitter within range of both the vehicle learning transmitter and the garage door operator. The garage door operator receives the radio frequency signal from the trained transmitter, decrypts and parses the access code of the RF signal, and opens the barrier. Upon receiving the RF signal from the trained transmitter, the garage door opener starts a time window to initiate a learning process.

The vehicle learning transmitter also decrypts and parses the RF signal from the trained transmitter. The vehicle learning transmitter adapts or derives a unique transmitter identifier, a rolling code, and a payload from the transmitter identifier, rolling code, and payload of the RF signal from the trained transmitter. For example, the vehicle learning transmitter may prepend or append a value to the transmitter identifier of the trained transmitter.

Next, the user presses a button of the vehicle learning transmitter within the time window set by the operator and the vehicle learning transmitter transmits a RF signal including the derived transmitter identifier, a derived rolling code (e.g. a next or subsequent rolling code to the rolling code that was transmitted by the trained transmitter), and a derived payload.

Upon the garage door operator receiving the RF signal from the vehicle learning transmitter within the time window, the garage door operator determines whether the derived transmitter identifier, rolling code, and payload correspond to the trained transmitter that last caused the garage door opener to move the garage door.

Some prior security systems for movable barrier operators utilize a unidirectional communication of the access code from the trained or learned transmitter to the movable barrier operator. The movable barrier operator authenticates the access code received from the transmitter and changes the state of the movable barrier if the access code has been learned by the movable barrier operator.

Some newer security systems utilize a bidirectional communication security protocol such as disclosed in U.S. Pat. No. 10,652,743. In one approach, the bidirectional communication security protocol generally involves a transmitter communicating a first signal to the movable barrier operator, the movable barrier operator sending a second signal to the transmitter in response to the first signal, and the transmitter sending a third signal to the movable barrier operator in response to the second signal. The back-and-forth of communication signals between the transmitter and the movable barrier and changing codes of the signals provides an additional layer of security against "man-in-the middle" attacks.

A customer may purchase a newer garage door opener that includes a bidirectional communication security protocol but already owns a vehicle with a learning transmitter. The vehicle learning transmitter of the customer may not be compatible with bidirectional communication security protocols. In this situation, the user may be unable to operate the newer garage door opener using the learning transmitter in the customer's vehicle.

DETAILED DESCRIPTION

Figure 1:
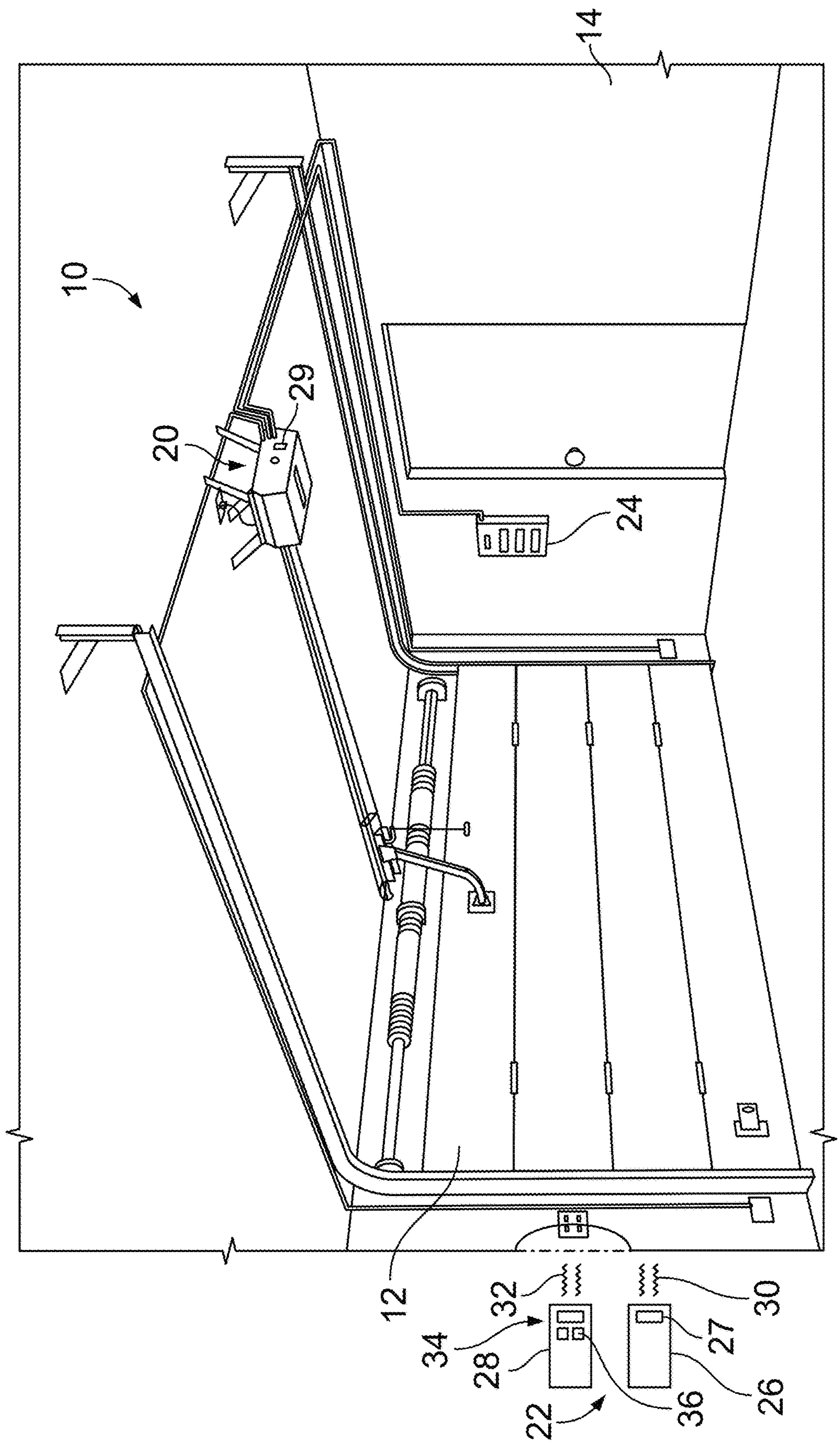
FIG. 1 is a perspective view of an example movable barrier operator system including a trained transmitter and a learning transmitter.

Regarding FIG. 1, a movable barrier operator system 10 is provided that is operable to move a movable barrier 12 between open and closed positions to control access to a secured area such as a garage 14. The movable barrier operator system 10 includes a movable barrier operator 20 and one or more remote controls 22 such as a wall control 24, a trained transmitter 26, and a trainable transmitter such as a learning transmitter 28. The trained transmitter 26 may be provided with the movable barrier operator 20 so that the access code transmitted by the trained transmitter 26 has been learned by the movable barrier operator 20. The movable barrier operator 20 and the trained transmitter 26 communicate using a second communication protocol. A user provides a user input to a user interface 27 of the trained transmitter 26, which causes the trained transmitter 26 to transmit a signal 30 including the access code to the movable barrier operator 20. The movable barrier operator 20 includes a user interface, such as a learning mode button 29, to receive a user input such as a button press and cause the movable barrier operator 20 to enter a learning mode wherein the movable barrier operator 20 will learn an access code sent from a remote control.

The learning transmitter 28 is operable to receive the signal 30 from the trained transmitter 26, decrypt and parse the relevant portions of the access code, and transmit its own signal 32 to the movable barrier operator 20 to cause the movable barrier operator 20 to learn the learning transmitter 28 without a user having to press the learning mode button 29 to initiate the learning mode of the movable barrier operator 20. The learning transmitter 28 includes a user interface 34, such as one or more buttons 36. The learning transmitter 28 may be programmed so that the different buttons 36 of the learning transmitter 28 cause the learning transmitter 28 to transmit signals with different access codes to operate different devices, such as movable barrier operators, lights, locks, and/or a security system.

Figure 2:
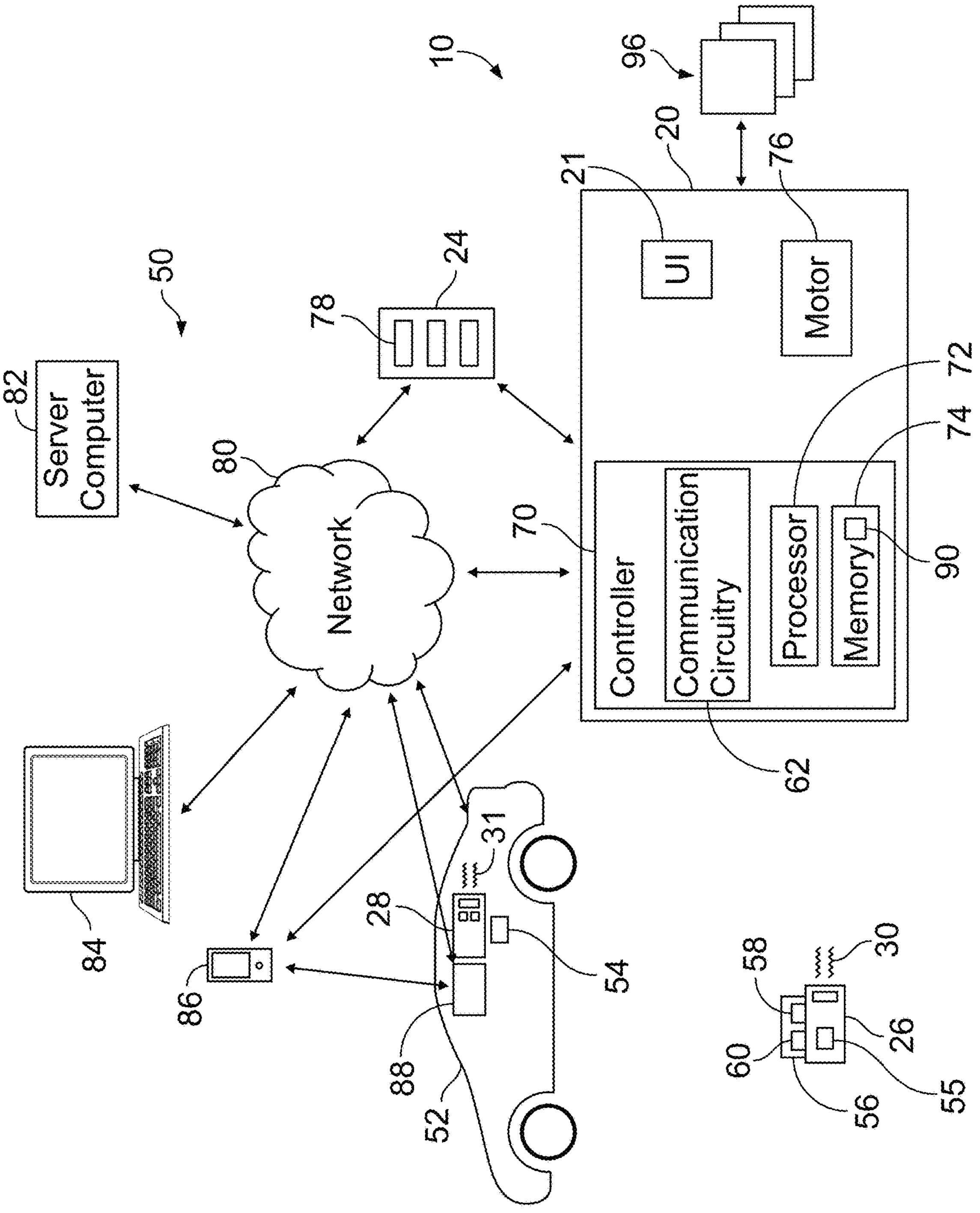
FIG. 2 is a schematic view of an example system including the movable barrier operator system of FIG. 1 wherein the learning transmitter is a component of a vehicle.

Regarding FIG. 2, a system 50 is provided that includes the movable barrier operator system 10. In FIG. 2, the learning transmitter 28 is an in-vehicle learning transmitter. The learning transmitter 28 may be integrated in a dashboard, rear view mirror, or infotainment system of a vehicle 52 as some examples. As a further example, the vehicle 52 has a display that operates as a user interface of the learning transmitter 28 and other components of the learning transmitter 28 are installed near the front of the vehicle 52.

The learning transmitter 28 includes communication circuitry, such as a transceiver 54, that is configured to communicate with the movable barrier operator 20 and the trained transmitter 26 using a first communication protocol. The first communication protocol includes, for example, radio frequency transmissions 31 at 315 MHz, 390 MHz, or 418 MHz. The first communication protocol may utilize communications having a frequency of less than 1 GHz. The first communication protocol may be a unidirectional communication protocol, e.g., a first device transmits an access code to a second device, but the second device does not send a signal to the first device to complete authentication of the first device. In some embodiments, the learning transmitter 28 is operable to communicating using a plurality of communication protocols other than the second communication protocol. The plurality of communication protocols of the learning transmitter 28 may include RF signals having different frequencies, formats, and/or encryption techniques as some examples to permit the learning transmitter 28 to communicate with a plurality of movable barrier operator types (e.g., different manufacturers and/or models of garage door openers).

Figure 3:
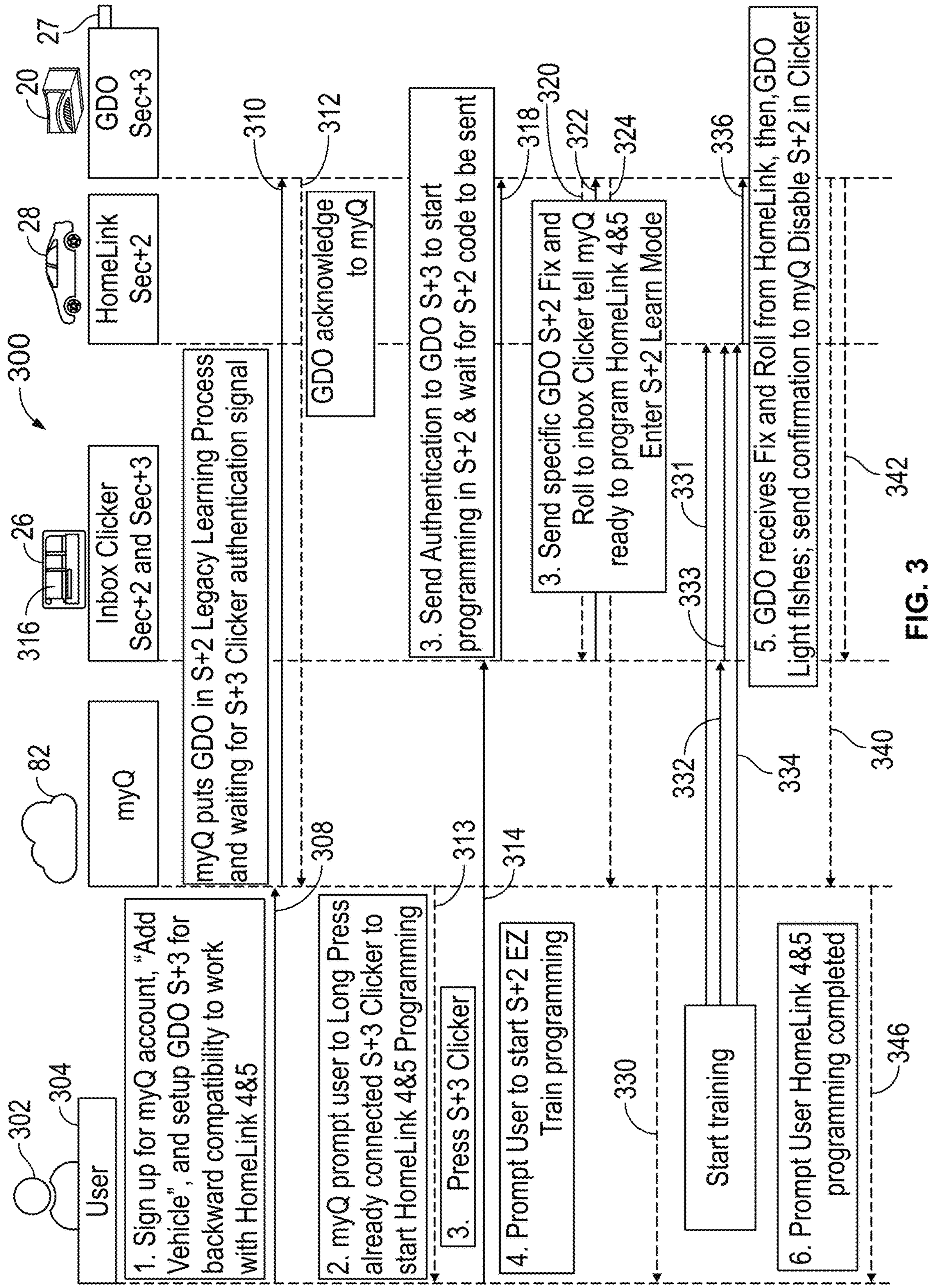
FIG. 3 is a flow diagram of an example method of facilitating learning of a learning transmitter by a movable barrier operator.

The trained transmitter 26 has a controller 55 operatively connected to communication circuitry 56 and a user interface such as one or more buttons 316 (see FIG. 3). The communication circuitry 56 includes a transmitter 58 that is configured to transmit a RF signal to the learning transmitter 28 via the first communication protocol. In one embodiment, the transmitter 58 is a transceiver with both transmitting and receiving capabilities. In another embodiment, the transmitter 58 comprises a distinct receiver and a transmitter.

The communication circuitry 56 of the trained transmitter 26 also includes a transceiver 60 operable to communicate with the movable barrier operator 20 using a second communication protocol that is different than the first communication protocol. The second communication protocol may be a bidirectional communication protocol, e.g., a first device transmits an access code to the second device and the second device sends a response signal to the first device to facilitate authentication of the first device. Additional communications between the first and second devices may be utilized in the bidirectional communication protocol, such as the first device transmitting a reply signal to the second device in response to the first device receiving the response signal from the second device. The second communication protocol may include various long-range and short-range wireless communication approaches such as Bluetooth®, Zigbee, Z-Wave, and/or 6LoWPAN. The second communication protocol may utilize radio frequency communications at a frequency of at least 2 GHz. In one embodiment, the transceiver communicates with the movable barrier operator 20 using a Bluetooth low energy (BLE) protocol such as BLE 5. In this manner, the trained transmitter 26 may communicate in a unidirectional, legacy manner with the learning transmitter 28 using the first communication protocol as well as communicate in a bidirectional manner with the movable barrier operator 20 using the second communication protocol.

The movable barrier operator 20 has a controller 70 including communication circuitry 62, a processor 72, and a memory 74. The controller 70 operates a motor 76 of the movable barrier operator 20 and responds to commands from learned remote controls 22. The wall control 24 has a user interface such as one or more buttons 78 and communicates via wired or wireless approaches with the movable barrier operator 20. The movable barrier operator 20 and the wall control 24 may be connected via one or more networks 80, such as a local Wi-Fi network and the internet to one or more remote devices. The one or more remote devices may include, for example, a server computer 82, a personal computer 84, a portable electronic device such as a portable electronic device 86, and an in-vehicle device 88 of the vehicle 52. The in-vehicle device 88 includes, or is operably coupled to, the learning transmitter 28. The in-vehicle device 88 has a wireless network interface operable to communicate via one or more wireless networks such as wide-area or cellular approaches (3G, 4G, 4G-LTE, and/or 5G), Wi-Fi, and/or Bluetooth®.

The movable barrier operator 20 communicates the state of the garage door 12 to the server computer 82 as well as receives status/state inquiries and/or control commands via the network 80 from the portable electronic device 86 and/or personal computer 84. The memory 74 of the movable barrier operator 20 stores a data structure, such as a whitelist 90, including data regarding the access codes of learned remote controls. The processor 72 facilitates the communication circuitry 62 communicating updates to the server computer 82 regarding the remote controls 22 that have been learned by the movable barrier operator 20. The movable barrier operator 20 may also broadcast to and receive communications from one or more auxiliary devices 96 such as a camera, an optical sensor, a presence detector, a smart lock, a light, and/or a security system, as some examples.

The trained transmitter 26 and the movable barrier operator 20 are each capable of communicating using at least two different communication protocols including the first communication protocol and the second communication protocol. The second communication protocol is the default communication protocol of the trained transmitter 26 and the movable barrier operator 20. The learning transmitter 28 is capable of communicating using the first communication protocol but not the second communication protocol. The inability of the learning transmitter 28 to communicate using the second communication protocol inhibits the learning transmitter 28 from communicating with the movable barrier operator 20 using the default communication protocol of the movable barrier operator 20.

To facilitate the movable barrier operator 20 learning the learning transmitter 28 despite the learning transmitter 28 being unable to communicate using the second communication protocol, the movable barrier operator 20 and the trained transmitter 26 are operable in a legacy learning process wherein the movable barrier operator 20 and trained transmitter 26 interact with the learning transmitter 28 using the first communication protocol as discussed below. Once the movable barrier operator 20 has learned the learning transmitter 28, the movable barrier operator 20 enters an operating mode wherein movable barrier operator 20 listens for transmissions from the learning transmitter 28 using the first communication protocol and listens for transmissions from other transmitters using the default second communication protocol. The movable barrier operator 20 will respond to transmissions from the learning transmitter 28 using the first communication protocol, but ignores transmissions from unlearned transmitters using the first communication protocol. In this manner, the movable barrier operator 20 defaults to communicating using the second communication protocol unless trained to use the first communication protocol for a given transmitter (e.g., learning transmitter 28).

Regarding FIG. 3, an example method 300 is provided that facilitates the movable barrier operator 20 learning the learning transmitter 28 despite the learning transmitter 28 being unable to communicate using the second communication protocol. The method 300 includes a user 302 utilizing a user device 304 to sign up for an account. The user 302 provides one or more user credentials, such as a username, password, and a mobile phone number for a two-factor authentication procedure. The user 302 provides identifying information for one or more devices the user 302 wants to associate with the user account, such as the movable barrier operator 20, the trained transmitter 26, a lock, a light, a vehicle, and/or a security system. The user 302 may provide identifying information in a number of approaches, such as by using a camera of the user device 304 to capture an indicium indicative of an identifier of the device, such as barcode, QR code, vehicle identification number, and/or serial number. The identifier of the device may be a universally unique identifier (UUID) in one approach. The user 302 sets up one or more user profiles for users that are to be associated with the user account. Details of the account are stored in the server computer 82 which may be, for example, one or more computers of a cloud computing system or middleware layer.

In the method 300, the user 302 accesses the user account via the user device 304, selects the garage door opener 20, and requests 308 that the garage door opener 20 participate in a legacy learning process for the learning transmitter 28. The server computer 82 sends a communication 310 to the movable barrier operator 20 that places the movable barrier operator 20 in the legacy learning mode. The movable barrier operator 20 communicates an acknowledgement 312 of entering the legacy learning mode to the server computer 82 and stands by for a communication from the trained transmitter 26.

The server computer 82 receives the acknowledgement 312 and prompts 313 the user 302 to provide a user input (e.g., a button press) to the trained transmitter 26 to start the legacy learning process. The prompt 312 may include, for example, a visual and/or auditory notification provided via a user interface of the user device 304. The user 302 actuates 314 (e.g. via a button press) the trained transmitter 26 in response to the prompt 312 such that the trained transmitter 26 transmits a communication 318 to the movable barrier operator 20 using the second communication protocol. The communication 318 includes an access code having, for example, a fixed code, a rolling code, and a payload.

The movable barrier operator 20 recognizes the access code of the communication 318 as being sent from the trained transmitter 26. Upon receiving the access code from the trained transmitter 26, the movable barrier operator 20 determines the trained transmitter 26 is ready to participate in the legacy learning process. The movable barrier operator 20 calculates one or more legacy codes to provide to the learning transmitter 28 via the trained transmitter 26. In one embodiment, the one or more legacy codes include a fixed code and a rolling code. The one or more legacy codes may be calculated based at least in part on one or more portions of the access code of the trained transmitter 26. In another embodiment, the one or more legacy codes are randomly generated by the movable barrier operator 20. For example, the one or more legacy codes may be generated from code values seeded in the memory 74 at manufacture of the movable barrier operator 20.

The movable barrier operator 20 communicates 320 the one or more legacy codes (e.g., a fixed code and a changing code) calculated by the movable barrier operator 20 to the trained transmitter 26 using the second communication protocol. The trained transmitter 26 acknowledges 322 receipt of the fixed code and the changing code.

Upon receiving the one or more legacy codes from the movable barrier operator 20, the trained transmitter 26 enters the legacy training mode. The communication 320 includes a code, value, or other data that causes the trained transmitter 26 to exit an operating mode and enter the legacy programming mode. In one embodiment, the communication 320 may include one or more parameters relating to the first security communication protocol. The trained transmitter 26 utilizes the one or more parameters to configure itself to communicate using the first communication protocol.

The movable barrier operator 20 sends 324 a message to the remote server 82 indicating that the trained transmitter 26 is ready to train the learning transmitter 28. The remote server 82 prompts 330 the user 302 via the user device 304 to start training the learning transmitter 28.

In response to the prompt 330, the user 302 provides 331 a user input to the learning transmitter 28, such as by pressing an unlearned button of the learning transmitter 28, to place the learning transmitter in the learn mode. As another example, the user 302 presses a predetermined pattern of buttons of the learning transmitter 28. The learning transmitter 28 may set a time window, such as five seconds, for receiving a RF signal from another transmitter before the learning transmitter 28 exits the learning mode and enters an operating mode.

The user actuates the trained transmitter 26 to cause the trained transmitter 26 to send a transmission 333 using the first communication protocol. The transmission 333 includes an access code having the one or more legacy codes the trained transmitter 26 received from the movable barrier operator 20 at operation 320. Actuation of the trained transmitter 26 may be performed by the user 302 providing a user input 332 to the trained transmitter 26. The user input 332 may include the user 302 pressing a button of the trained transmitter 26 that would cause the trained transmitter 26 to transmit an access code using the second communication protocol if the trained transmitter 26 were in the operating mode. However, because the trained transmitter 26 is in the legacy programming mode after receiving communication 320, the trained transmitter 26 transmits 333 the access code including the one or more legacy codes (e.g., the fixed code and the changing code) received at communication 320 using the first communication protocol. The trained transmitter 26 may transmit 333 the access code including the one or more legacy codes a plurality of times to give the training transmitter 28 an opportunity to receive the one or more legacy codes. The learning transmitter 28 receives the transmission 333. In some embodiments, the movable barrier operator 20 also receives the transmission 333 and uses receipt of the transmission 333 as a requirement to continue with the learning process.

With the learning transmitter 28 in the learning mode, the learning transmitter decrypts and parses the transmission 333 from the trained transmitter 26. The learning transmitter 28 stores a representation of the access code of transmission 333 from the trained transmitter 26 in a memory of the learning transmitter 28. The learning transmitter 28 adapts or derives one or more codes from the representation of the transmission 333, such as deriving a fixed code and a changing code from the fixed code and the changing code of the transmission 333. The fixed code and the changing code derived by the learning transmitter 28 may be unique to the learning transmitter 28.

In one embodiment, deriving the fixed code includes prepending or appending a value to the fixed code of the transmission 333. By utilizing a derived fixed code that includes the original fixed code, the movable barrier operator 20 and server computer 82 may track the learning transmitters trained by a particular trained transmitter 26. As a further example, deriving the changing code includes incrementing the changing code of the transmission 333. The incrementing of the changing code may include incrementing the changing code while keeping the changing code within a window expected by the movable barrier operator 20.

The user device 304 continues to guide the user 302 through the process to train the movable barrier operator 20 to recognize communications from the learning transmitter 28. The user device 304 prompts the user 302 to provide a user input 334 to the learning transmitter 28.

In response to receiving the user input 334, the learning transmitter 28 sends a transmission 336 using the first communication protocol. The transmission 336 includes the one or more codes derived from the one or more legacy codes. For example, the transmission 336 includes a unique fixed code, a unique rolling code, and a payload derived from the access code the learning transmitter 28 received from the trained transmitter 26.

The movable barrier operator 20 receives the transmission 336 including the derived fixed code and the rolling code from the learning transmitter 28. If the derived code(s) of transmission 336 correspond to the access code of the transmission 333, the movable barrier operator 20 learns the fixed code and the rolling code of the learning transmitter 28. For example, the movable barrier operator 20 stores the fixed code and the rolling code of the learning transmitter 28 on the whitelist 90 in the memory of the movable barrier operator 20. The derived code(s) of the transmission 336 correspond to the access code of the transmission 333 if the derived code(s) have a predetermined relationship to the access code of the transmission 333. In one example, the access code of the transmission 333 may include a first fixed code and a first changing code. The derived code(s) of the transmission 336 may include a second fixed code and a second changing code. The second fixed code includes the first fixed code with a value added thereto. The second changing code includes a changing code that is within a predetermined number of increments from the first changing code.

If the transmission 336 contains a derived code that does not correspond to the access code of the transmission 333, the movable barrier operator 20 does not learn the fixed code and the rolling code of the learning transmitter 28. For example, the learning transmitter 28 may utilize an incorrect algorithm which results in a rolling code not expected by the movable barrier operator 20.

The movable barrier operator 20 provides a response 340 to the server computer 82 indicating that the learning transmitter 28 has been learned. The response 340 is communicated to the server computer 82 to indicate/confirm learning of the learning transmitter 28 and cause updating of a user account to indicate the now-learned learning transmitter 28 in a list of devices associated with the user account.

The learning transmitter 28 exits the learning mode after sending the transmission 336. In one embodiment, the transmitter 28 exits the learning mode after a predetermined period of time after sending the transmission 336.

The movable barrier operator 20 sends 342 a command to the trained transmitter 26 to cause the transmitter 26 to exit the legacy programming mode and return to the operating mode. In some embodiments, the trained transmitter 26 is capable of receiving a command (e.g. command 342) via the second communication protocol while the trained transmitter 26 is in the legacy training mode. Additionally or alternatively, the trained transmitter 26 may exit the legacy training mode after a predetermined time period, such as a predetermined time period after transmission 333. The transmitter 26 exiting the legacy programming mode disables communications from the trained transmitter 26 using the first communication protocol. The transmitter 26 returns to the communicating using the second communication protocol once the transmitter 26 has entered the operating mode.

The movable barrier operator 20 may provide a notification to the user the training process was successful, such as the movable barrier operator 20 flashing a light of the user interface 21, outputting a sound from an integrated speaker/sounder, or illuminating a worklight of the operator 20. The server computer 82 communicates 346 with the user device 304 to notify the user that the programing of the learning transmitter 28 has been completed.

In one embodiment, upon a successful learning procedure, the movable barrier operator 20 scans in an alternating fashion between a first interval for transmissions utilizing the second communication protocol and a second interval for transmissions utilizing the first communication protocol that contain the fixed code and the changing code of the learning transmitter 28. The movable barrier operator 20 ignores transmissions utilizing the first communication protocol that do not include the fixed code and the changing code of the learning transmitter 28.

Figure 4A:
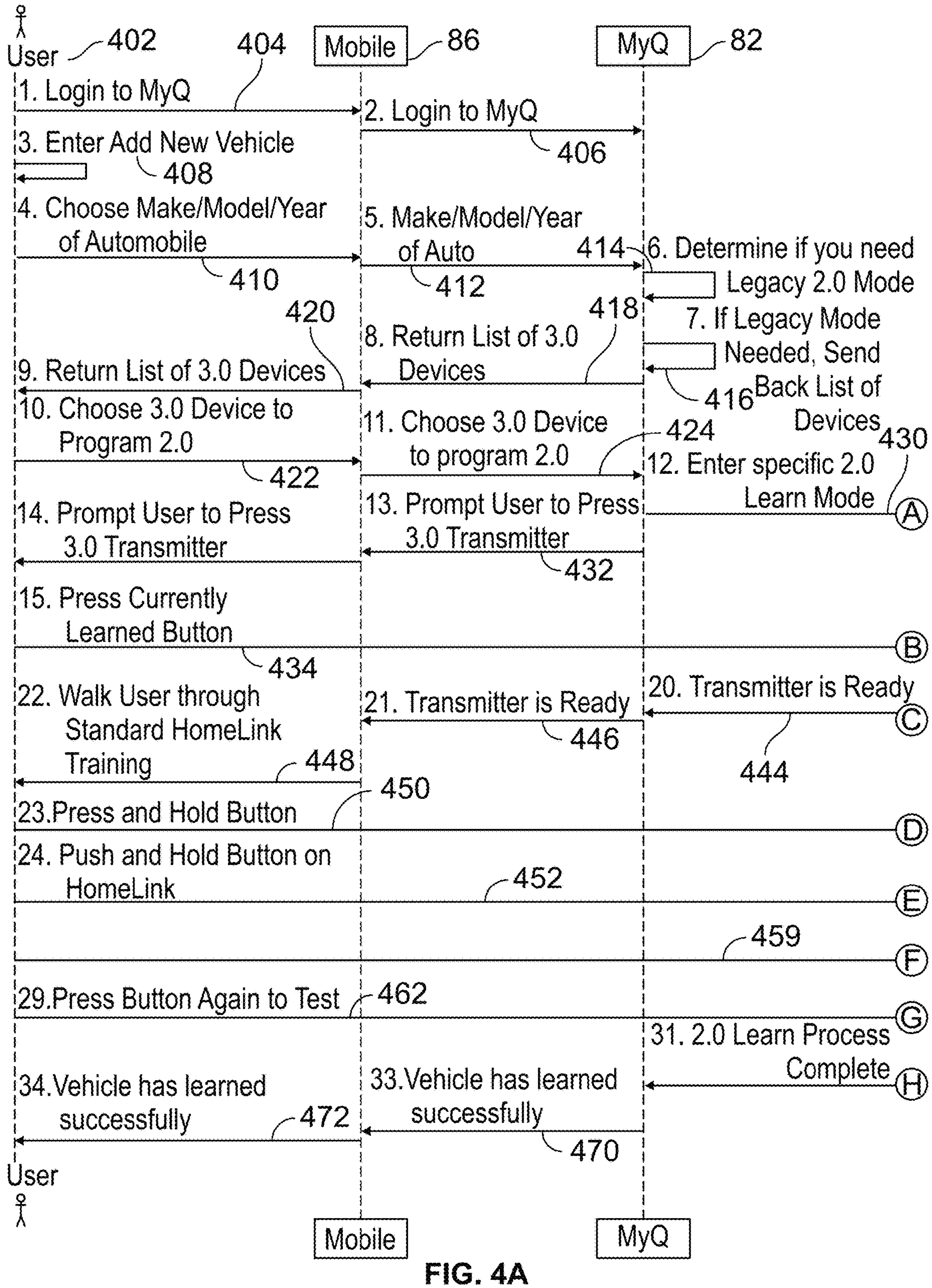
FIGS. 4A and 4B illustrate a flow diagram of a second example method of facilitating learning of a learning transmitter by a movable barrier operator.
Figure 4B:
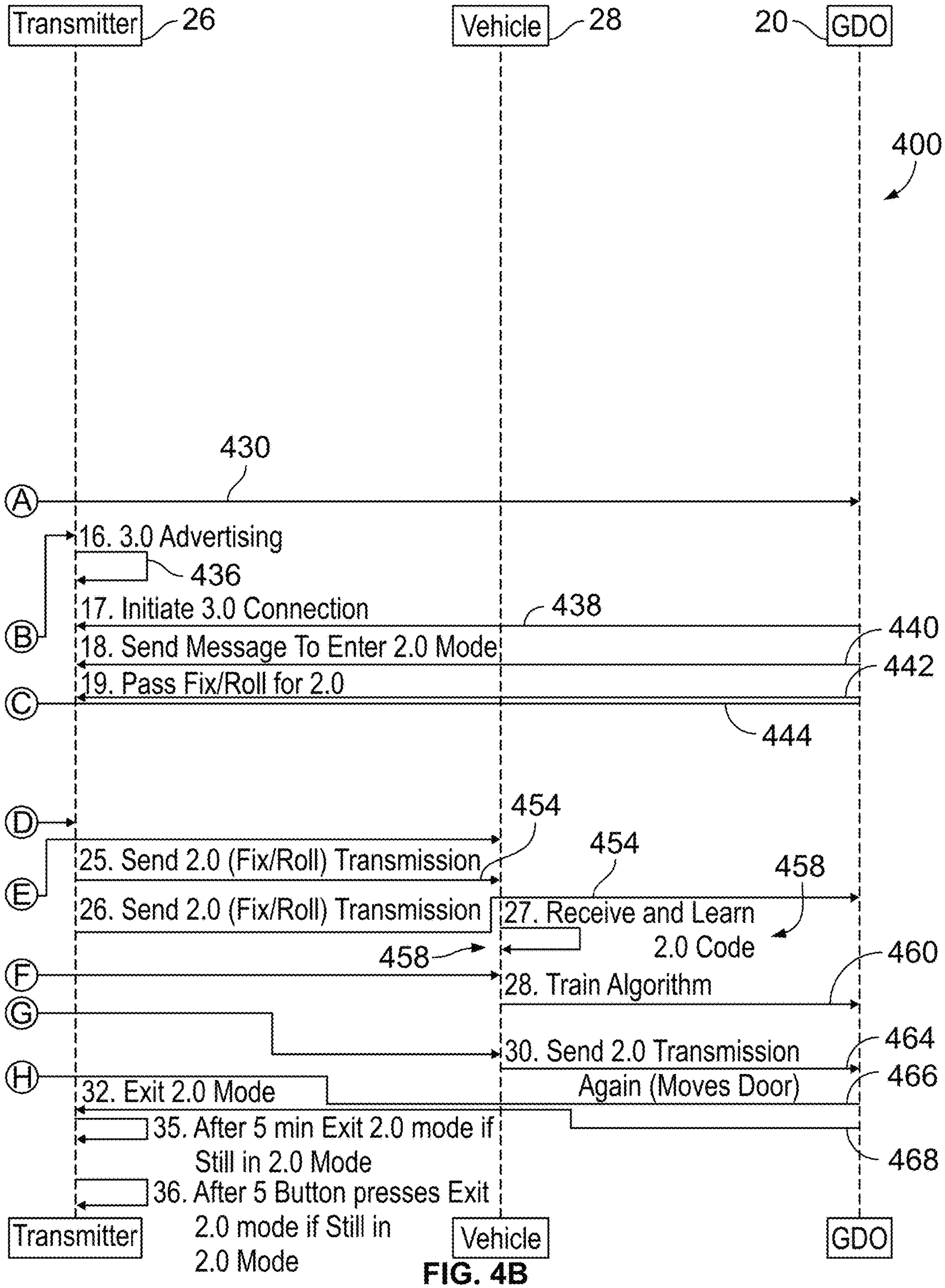

Regarding FIG. 4, an example method 400 is provided that is similar in many respects to the method 300 discussed above such that differences will be highlighted. One difference is that the method 400 utilizes the portable electronic device 86 to guide a user 402 during the method 400. The method 400 includes the user providing 404 credentials associated with an account of the user 402 to the portable electronic device 86 so that the portable electronic device 86 may provide 406 the credentials to the server computer 82. The user 402 provides an input 408 requesting the association of a vehicle with the user account. The vehicle has the learning transmitter 28 integrated therein, such as a HomeLink® system.

The user 402 selects 410 vehicle data such as the make, model, and year of the vehicle and the portable electronic device 86 provides 412 the vehicle data to the server computer 82. The server computer 82 determines 414 whether the movable barrier operator 20 will proceed to utilize the first communication protocol to communicate with the learning transmitter 28 of the vehicle based on the vehicle data provided by the portable electronic device 86.

If the server computer 82 determines that the first communication protocol is to be used with the learning transmitter 28, the server computer 82 determines 416 one or more remote controls 22 that may be used to train the learning transmitter 28. For example, the server computer 82 may generate a list of remote controls 22 that are capable of communicating using both the first communication protocol and the second communication protocol. The list of remote controls 22 is communicated 418 to the portable electronic device 86.

The portable electronic device 86 provides 420 the list of remote controls 22 to the user 402. The list of remote controls 22 includes the trained transmitter 26. The user selects 422 the trained transmitter 26 to use to train the learning transmitter 28. The portable electronic device 86 provides 424 the selected trained transmitter 26 and the server computer 82 communicates 430 a message to the movable barrier operator 20 that the trained transmitted 26 will be used to participate in training the learning transmitter 28.

The server computer 82 prompts 432 the user 402 to provide a user input to the trained transmitter 26, such as pressing a button of the trained transmitter 26 that has previously been learned by the movable barrier operator 20. The user 402 provides 434 the user input to the trained transmitter 26. The trained transmitter 26 advertises 436 using the default second communication protocol. The movable barrier operator 20 initiates 438 a connection with the trained transmitter 26 using the second communication protocol. The movable barrier operator 20 communicates 440 a command to the trained transmitter 26 to enter the legacy programming mode. Upon the trained transmitter 26 receiving the communication 440, the trained transmitter 26 recognizes that the trained transmitter will be used to train a transmitter using a legacy communication protocol (e.g., the first communication protocol).

The movable barrier operator 20 communicates 442 a fixed code and a rolling code to the trained transmitter 26. In one embodiment, the communication 442 is performed using the second communication protocol. The movable barrier operator 20 sends 444 a message to the server computer 82 indicating the trained transmitter 26 is ready to participate in the training of the learning transmitter 28. The server 82 sends 446 a message to the portable electronic device 86 indicating the trained transmitter 26 is ready.

The portable electronic device 86 provides 448 one or more outputs to the user 402 such as prompts or step-by-step information to guide the user 402 through the training process. In one example, the portable electronic device 86 provides images and/or text on a display of the portable electronic device 86.

The user 402 provides 452 a user input to the learning transmitter 28 to cause the learning transmitter 28 to enter a learning mode and identify which portion of the user interface (e.g., a button) the user 402 wants to be learned by the movable barrier operator 20. For example, the user may press an unlearned button of the learning transmitter 28 or a particular combination of buttons of the learning transmitter 28. In the learning mode, the learning transmitter 28 listens for transmissions using the first security protocol.

The user 402 also provides 450 a user input to the trained transmitter 26, such as a button press, which causes the trained transmitter 26 to send a transmission 454 that utilizes the first communication protocol. The transmission 454 includes an access code having the fixed code and the changing code provided to the trained transmitter 26 via communication 442 from the movable barrier operator 20. The transmission 454 (which is broadcast to an area proximate the trained transmitter 26, the learning transmitter 28 and the operator 20) is received at the learning transmitter 28 and the movable barrier operator 20 substantially contemporaneously.

The learning transmitter 28 upon reception of the transmission 454 from the trained transmitter 26, stores a representation of the access code of the transmission 454, and determines 458 one or more codes of the access code of the transmission 454. The determining 458 may include, for example, the learning transmitter 28 decrypting and parsing the access code to identify the fixed code and the rolling code. The learning transmitter 28 adapts or derives a rolling code and a fixed code from the representation of the access code.

Next, the user 402 provides 459 a user input to the learning transmitter 28 to cause the learning transmitter 28 to send a transmission 460 to the movable barrier operator 20 including the derived fixed code and changing code that was incremented from the derived changing code according to the changing code algorithm shared by the learning transmitter 28 and the movable barrier operator 20. The movable barrier operator 20 learns the fixed code and the changing code of the transmission 460.

In one embodiment, the movable barrier operator 20 sets a time window after the movable barrier operator 20 sends the fixed code and the rolling code to the trained transmitter 26 at operation 442. If the movable barrier operator 20 receives the transmission 460 from the learning transmitter 28 within the time window, the movable barrier operator 20 stores the derived fixed code and the derived rolling code of the learning transmitter 28 in the whitelist 90 of the movable barrier operator 20. The movable barrier operator 20 also authenticates the derived fixed code and the derived rolling code to confirm the derived fixed code and the derived rolling code correspond to the fixed code and the rolling code the movable barrier operator 20 generated and communicated to the trained transmitter 26 at operation 442.

In one embodiment, the movable barrier operator 20 and/or the server computer 86 suggests the learning transmitter 28 to operate the movable barrier operator 20 to complete the learning process. To this end, the user 402 is prompted to test the operation of the learning transmitter 28 such as via a request from the portable electronic device 86.

The user provides 462 a user input to the learning transmitter 28, such as pressing the button of the learning transmitter 28 the user 402 is learning to the movable barrier operator 20, which causes the learning transmitter 28 to transmit 464 a second communication via the first communication protocol. Because the movable barrier operator 20 has authenticated the derived fixed code and the derived rolling code of the learning transmitter 28, the movable barrier operator 20 causes a state change of the garage door 12 upon receiving the transmission 464. In this manner, the user visually observes that the learning transmitter 28 has been learned by the movable barrier operator 20.

The movable barrier operator 20 sends 466 a message to the server computer 82 indicating the learning process is complete. The movable barrier operator 20 sends 468 a command to the trained transmitter 26 to exit the legacy programming mode and return to the default mode wherein the trained transmitter 26 communicates with the movable barrier operator 20 via the second communication protocol. The server computer 82 sends 470 a message to the portable electronic device 86 indicating that the learning transmitter 28 has been learned successfully. The mobile device provides 472 a notification to the user 404 indicating the successful completion of the legacy learning process.

Figure 5A:
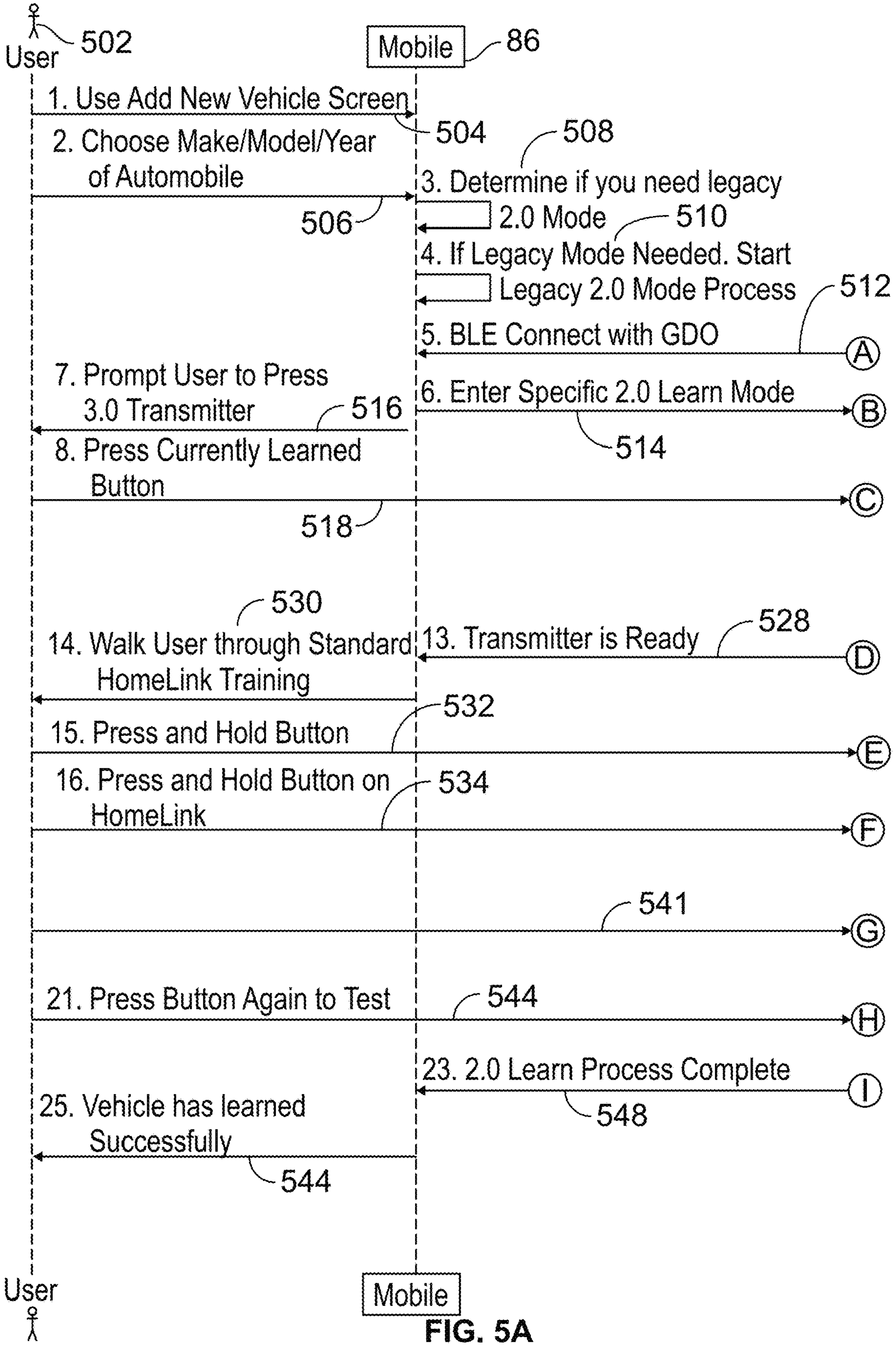
FIGS. 5A and 5B illustrate a flow diagram of a third example method of facilitating learning of a learning transmitter by a movable barrier operator.
Figure 5B:
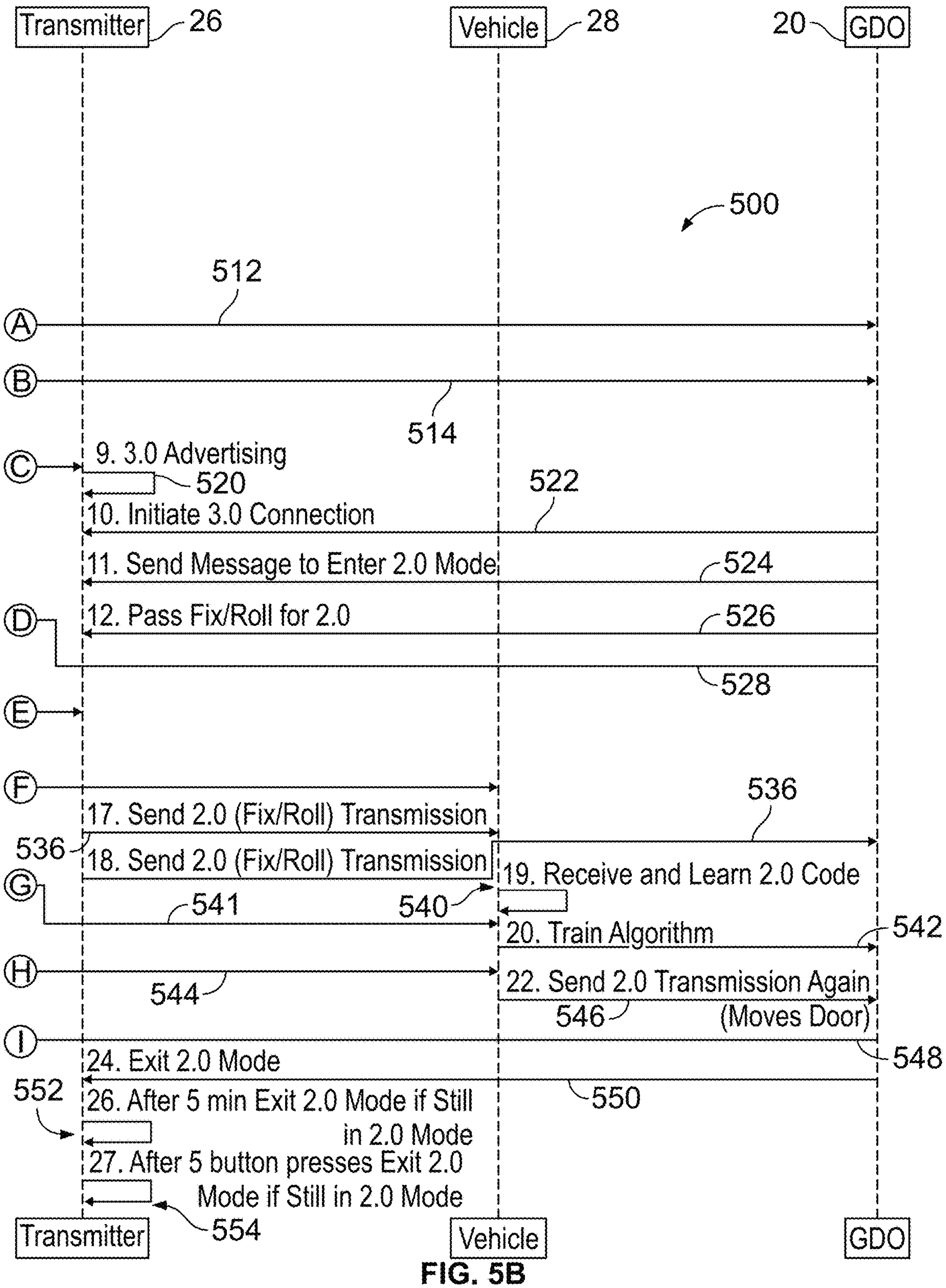

Regarding FIG. 5, another example method 500 is provided that is similar in many respects to the method 400 such that differences will be highlighted. One difference is that the method 500 permits a user to train the movable barrier operator 20 to recognize access codes from the learning transmitter 28 without the involvement, assistance, or use of a server computer 82, although it will be appreciated that the server computer 82 may be utilized in some embodiments. Further, the method 500 may utilize direct wireless communications between the devices participating in the method 500.

The method 500 includes a user 502 requesting 504 to add a vehicle to be associated with the user account at the portable electronic device 86. The user provides 506 vehicle data such as a make, model, and year of the vehicle. Based on the vehicle data, the portable electronic device 86 determines 508 (e.g. using a vehicle/transmitter lookup table or database stored in the portable electronic device 86) if the trained transmitter 26 and movable barrier operator 20 are to be placed into legacy learning mode in order to train the learning transmitter 28. If the portable electronic device 86 determines 510 legacy mode should be utilized, the portable electronic device 86 connects 512 with the movable barrier operator 20 using a wireless communication protocol, such as Bluetooth, BLE, and/or a local Wi-Fi network.

The portable electronic device 86 communicates 514 a command for the movable barrier operator 20 to enter the legacy learning mode. The portable electronic device 86 prompts 516 a user to provide 518 a user input to the trained transmitter 26 such as pressing a button of the trained transmitter 26 that has been learned by the movable barrier operator 20. In response to the user input, the trained transmitter 26 advertises 520 using the default second communication protocol and the movable barrier operator 20 initiates 522 a connection with the trained transmitter 26 using the second communication protocol.

The movable barrier operator 20 communicates 524 a command to the trained transmitter 26 to enter the legacy training mode and communicates 526 a fixed code and a rolling code to the trained transmitter 26 using the first communication protocol.

The movable barrier operator 20 sends 528 a message to the portable electronic device 86 indicating the trained transmitter 26 is ready. The portable electronic device 86 provides 530 one or more outputs to guide the user 502 through the training of the learning transmitter 28. The user 502 provides 534 a user input to the learning transmitter 28, such as pressing an unlearned button or a predetermined combination of buttons, which causes the learning transmitter 28 to enter a learning mode and identifies which button the user 502 wants the movable barrier operator 20 to learn. The user 502 also provides 532 a user input such as pressing a button or pressing and holding the button, of the trained transmitter 26.

In response to receiving the user input at operation 532, the trained transmitter 26 sends a broadcast transmission 536 via the first communication protocol. The transmission 536 includes an access code with the fixed code and the rolling code received from the movable barrier operator 20 at operation 526.

The transmission 536 is received substantially contemporaneously at the learning transmitter 28 and the learning transmitter 28. Upon receipt of transmission 536 from the trained transmitter, the learning transmitter 28 determines 540 one or more codes of the access code of the transmission 536. The learning transmitter 28 decrypts and parses the transmission 536 for the fixed code and the rolling code. The learning transmitter 28 derives a fixed code and a rolling code from the received transmission 536.

Next, the user provides 541 a user input to the learning transmitter 28 to cause the learning transmitter 28 to communicate a transmission 542 including the derived fixed code and the rolling code to the movable barrier operator 20 using the first communication protocol. The movable barrier operator 20 learns the fixed code and the changing code of the transmission 460.

The transmission 536 is also received at the movable barrier operator 20. The movable barrier operator 20 authenticates and stores the fixed code and the rolling code of the transmission 542.

The user 502 may optionally provide 544 a second user input to the learning transmitter 28, which causes the learning transmitter 28 to send a transmission 546 to the movable barrier operator 20. The transmission 546 includes an access code having the derived fixed code and a changing code that was incremented from the derived changing code. The movable barrier operator 20 recognizes the fixed code and the rolling code of the learning transmitter 28 and moves the garage door 12. The movable barrier operator 20 then communicates 548 a message to the portable electronic device 86 indicating that training is complete. The movable barrier operator 20 sends 550 a command to the trained transmitter 26 to change from the legacy training mode to the default mode and resume communication using the second communication protocol. The trained transmitter 26 alternatively or additionally has a timer and will exit 552 the legacy training mode if the trained transmitter 26 is still in the legacy training mode after a predetermined duration of time (e.g., five minutes) if the command 550 was not received. The trained transmitter 26 may also monitor button presses of the trained transmitter 26 and exit 554 the legacy training mode after a predetermined number (e.g. five) of button presses if the trained transmitter 26 is still in the legacy training mode.

Figure 6A:
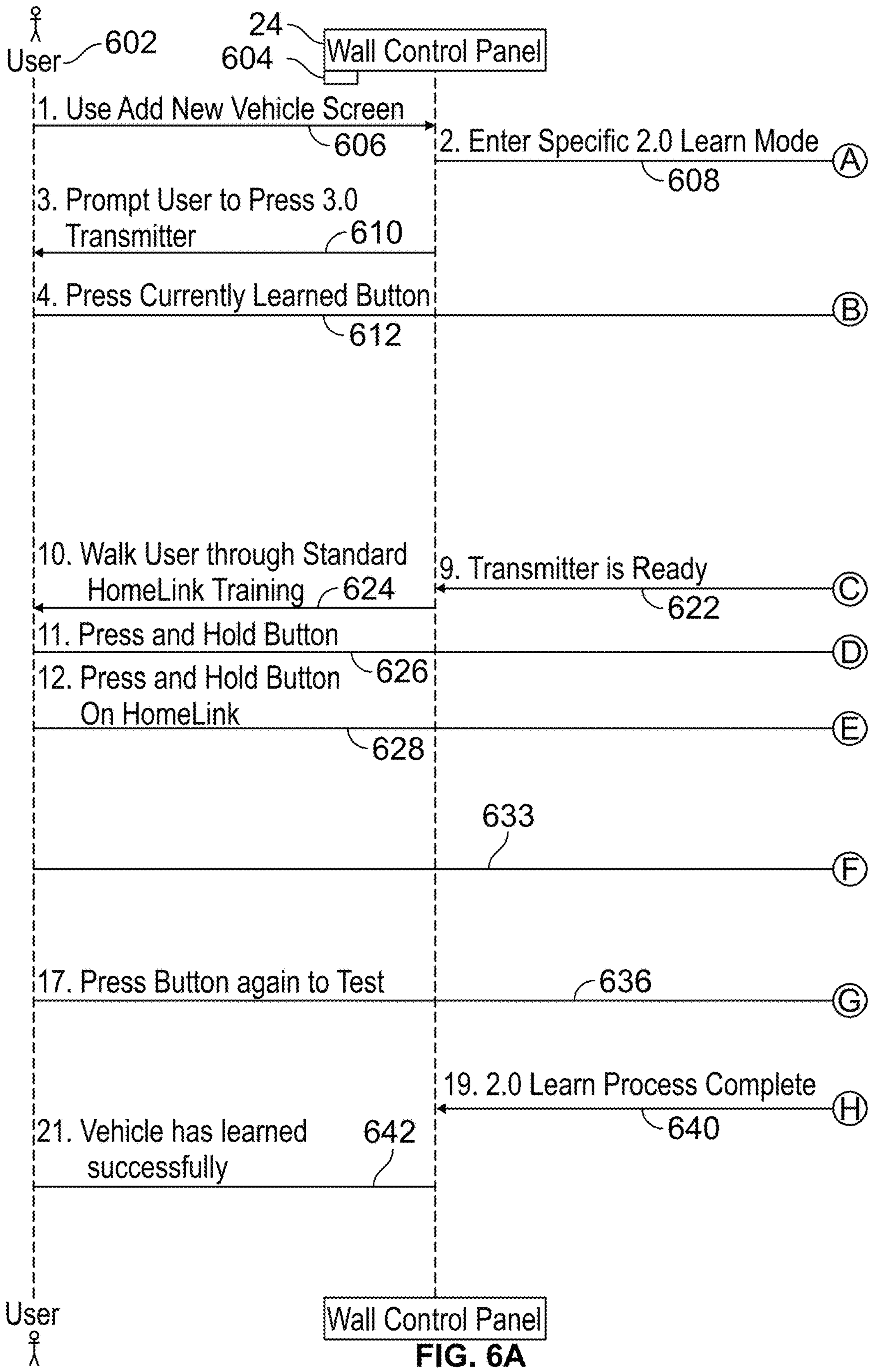
FIGS. 6A and 6B illustrate a flow diagram of a fourth example method of facilitating learning of a learning transmitter by a movable barrier operator.
Figure 6B:
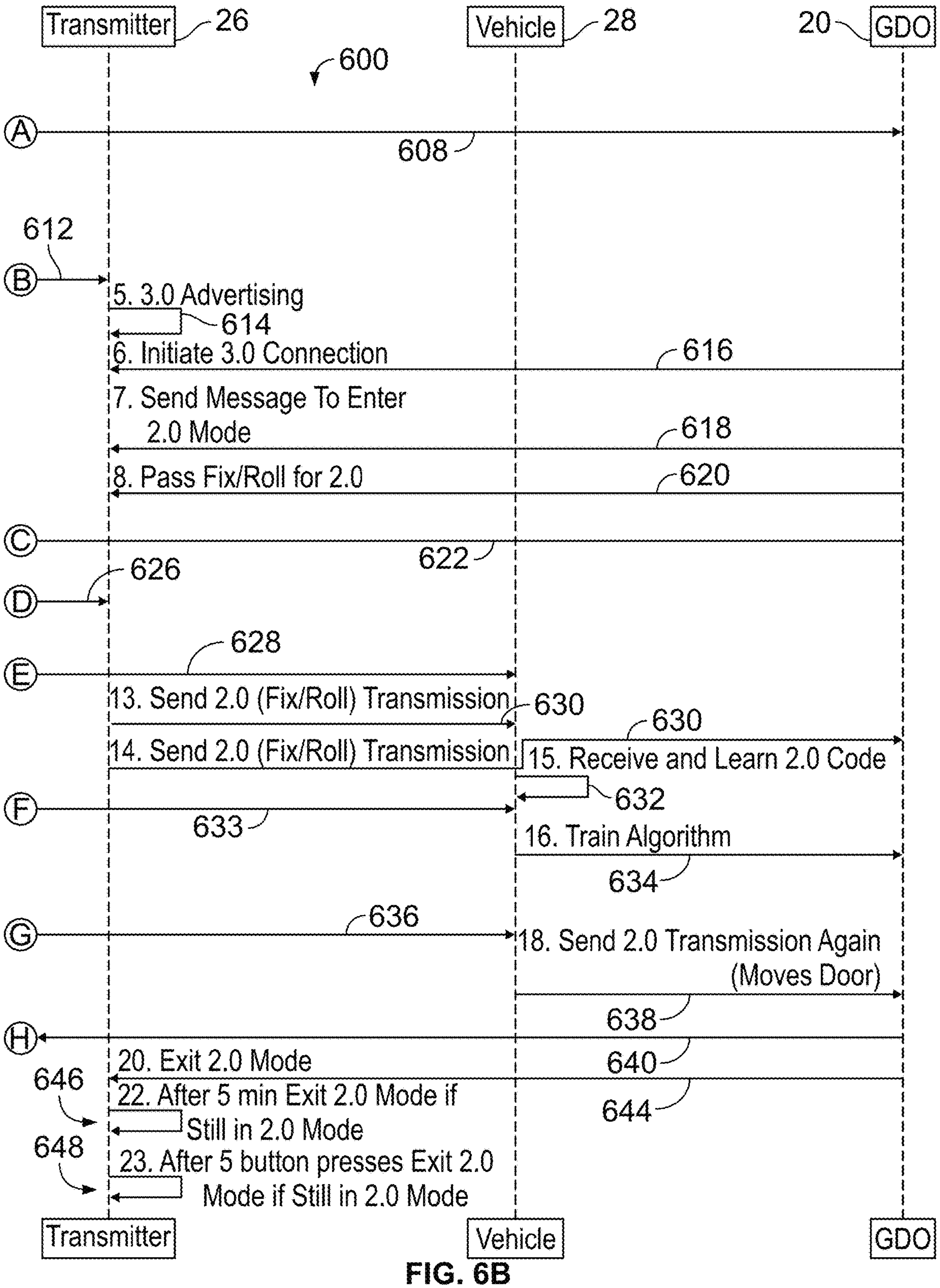

Regarding FIG. 6, another example method 600 is provided that is similar in many respects to the method 400 discussed above such that differences will be highlighted. One difference is that the method 600 includes a user 602 interacting with the wall control 24 rather than the user device 304. The wall control 24 includes a user interface 604 that may include, for example, the one or more buttons 78, a display to present one or more of icons, images, human-readable text, etc., a microphone, and/or speaker.

The user provides 606 a user input requesting to add a new vehicle to be associated with the account of the user 602. The wall control 24 communicates 608 a message to the movable barrier operator 20 requesting that the movable barrier operator 20 enter the legacy mode. The wall control 24 prompts 610 that the user 602 provide a user input 612 to the trained transmitter 26, such as by pressing a button on the trained transmitter 26 that has been previously learned by the movable barrier operator 20. The trained transmitter 26 advertises 614 using the second communication protocol and the movable barrier operator 20 initiates 616 a connection between the movable barrier operator 20 and the trained transmitter 26 via the second communication protocol.

Once connected, the movable barrier operator 20 sends 618 a command to the trained transmitter 26 to enter the legacy training mode. The movable barrier operator 20 communicates 620 a fixed code and a rolling code. The moveable barrier operator 20 then sends 622 a message to the wall control 24 indicating the trained transmitter 26 is ready to participate in the training of the learning transmitter 28.

The wall control 24 provides an output 624 via the user interface 604 to guide the user 602 through the process of training the learning transmitter 28.

The user 602 provides 628 a user input to the learning transmitter 28 that cause the learning transmitter 28 to enter a learning mode and indicate which button of the trained transmitter 28 the user 602 wants the movable barrier operator 20 to learn. For example, the user 602 presses a predetermined combination of buttons to place the learning transmitter 28 in the learning mode and presses a button of the trained transmitter 28 that the user 602 wants to be learned by the movable barrier operator 20.

The user 602 also provides 626 a user input to the trained transmitter 26. The trained transmitter 26 sends a transmission 630 via the first communication protocol. The transmission 630 includes an access code having the fixed code and the rolling code received from the movable barrier operator 20 at operation 620.

The transmission 630 is received at the learning transmitter 28 and the learning transmitter determines 632 the fixed code and the rolling code of the transmission 630. The learning transmitter 28 adapts or derives a fixed code and a rolling code from the access code of the transmission 630.

Next, the user 602 provides 633 a user input to the learning transmitter 28 to cause the learning transmitter 28 to send a transmission 634 to the movable barrier operator 20 via the first communication protocol. The transmission 634 includes an access code having the derived fixed code and the derived rolling code.

The movable barrier operator 20 decrypts and parses the access code of the transmission 634 to obtain the derived fixed code and the derived changing code, which the movable barrier operator 20 stores in the memory 74 to learn the learning transmitter 28.

The user is prompted, such as via the user interface 604 of the wall control 24, to provide another user input 636 to the learning transmitter 28. For example, the user 602 may be prompted to press the same button the user pressed at operation 628 wherein the user 602 identified the button of the learning transmitter 28 to be learned by the movable barrier operator 20.

In response to the user input 636, the learning transmitter 28 sends another transmission 630 via the first communication protocol. The transmission 630 includes the derived fixed code and an incremented changing code based on the derived changing code. Because the derived fixed code and the derived changing code were previously authenticated by the movable barrier operator 20, the movable barrier operator 20 moves the garage door 12 upon receiving the transmission 630.

The movable barrier operator 20 sends 640 a message to the wall control 24 that the movable barrier operator 20 has learned the learning transmitter 28. The wall control 24 provides 642 an output to the user 602 indicating that the learning transmitter 28 has been learned successfully. The movable barrier operator 20 sends 644 a command to the trained transmitter 26 to exit the legacy training mode. The trained transmitter 26 returns to the operating mode and resumes communicating with the movable barrier operator 20 using the second communication protocol.

The trained transmitter 26 may also be configured to monitor the time lapsed from the beginning of the legacy training mode and exits 646 the legacy training mode if the trained transmitter 26 has been in the legacy training mode for more than a predetermined duration such as five minutes. Similarly, the trained transmitter 26 may exit 648 the legacy training mode after a predetermined number of operations of the learning transmitter 28.

Figure 7A:
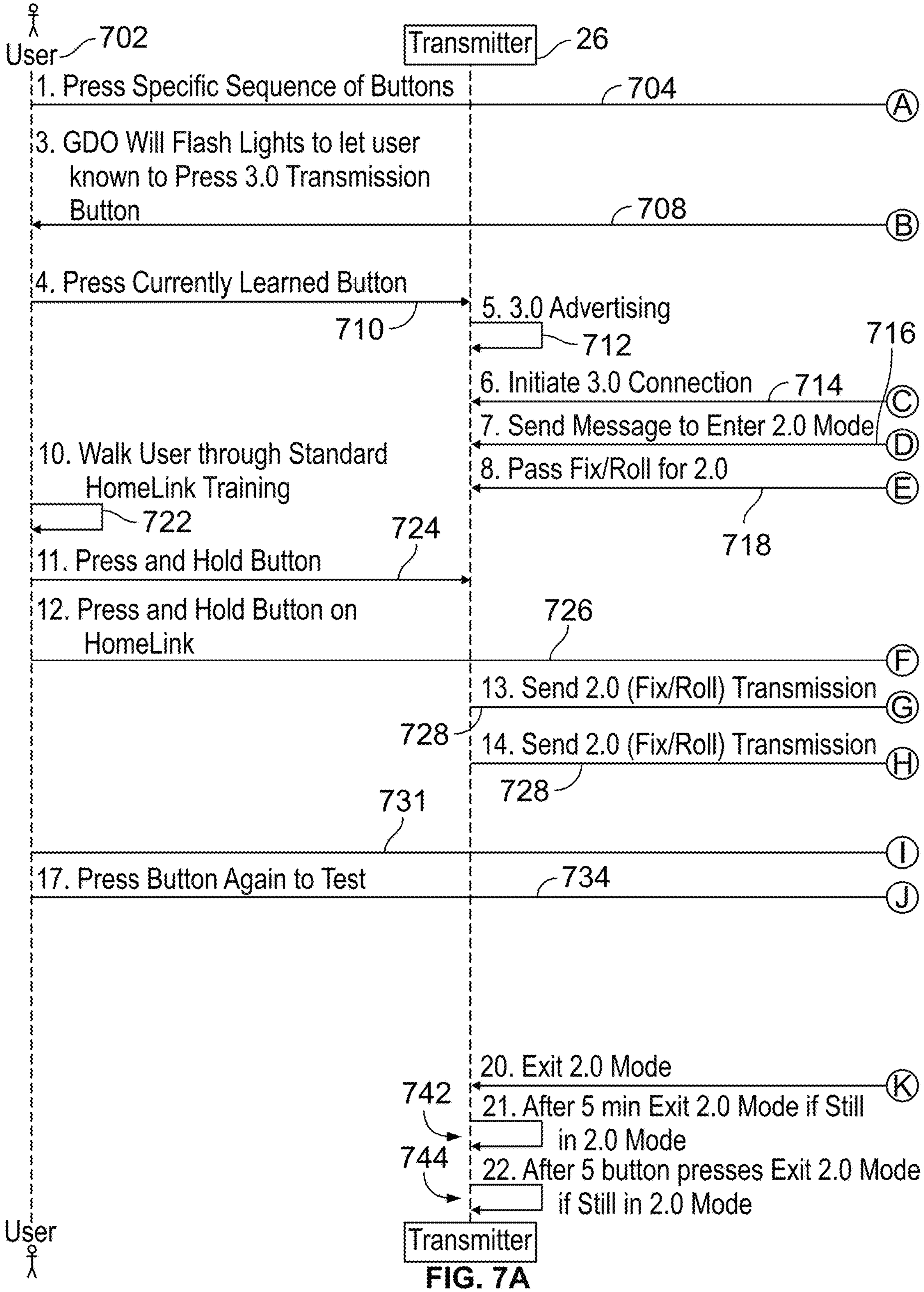
FIGS. 7A and 7B illustrate a flow diagram of a fifth example method of facilitating learning of a learning transmitter by a movable barrier operator.
Figure 7B:
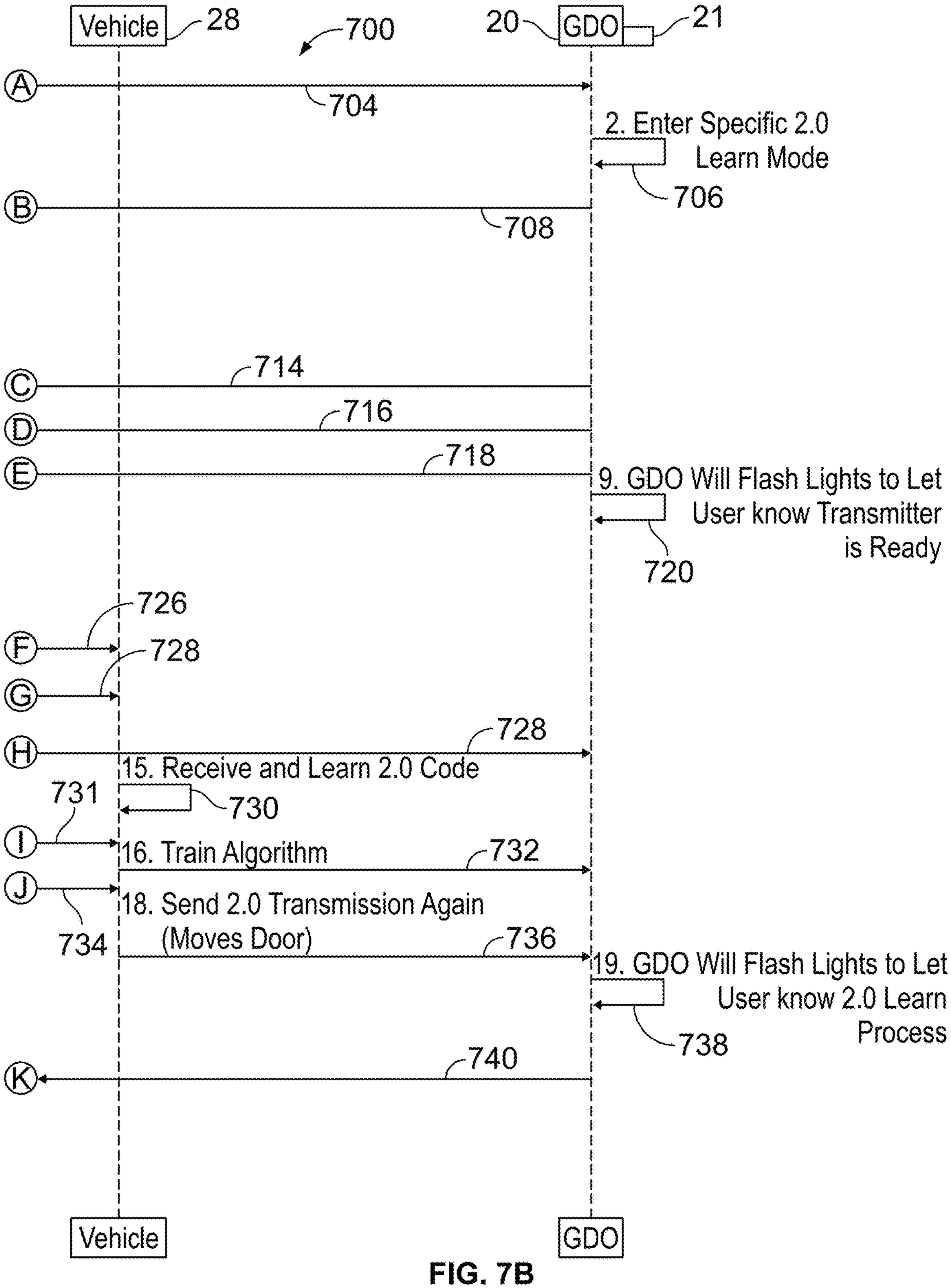

Regarding FIG. 7, another example method 700 is presented that is similar in many respects to the method 600 discussed above such that differences will be highlighted. One difference is that the method 700 involves a user 702 interfacing directly with the movable barrier operator 20 to coordinate the learning of the learning transmitter 28 by the movable barrier operator 20.

The method includes the user 702 providing 704 a user input to the user interface 21 of movable barrier operator 20. For example, the user 702 presses a button or a specific sequence of buttons of the user interface 21. The movable barrier operator 20 enters 706 the legacy learning mode in response to receiving the user input.

The movable barrier operator 20 provides 708 an output to the user 702 via the user interface 21, such as a flashing of one or more lights, that prompts the user 702 to activate the trained transmitter 26. The user 702 provides 710 a user input such as by pressing a button of the trained transmitter 26 that has been previously learned by the movable barrier operator 20. In response receiving the user input, the trained transmitter 26 advertises 712 using the second communication protocol.

The movable barrier operator 20 initiates 714 a connection between the movable barrier operator 20 and the trained transmitter 26. Once the connection between the movable barrier operator 20 and the trained transmitter 26 has been established, the movable barrier operator 20 communicates 716 a command to the trained transmitter 26 to enter the legacy training mode. The movable barrier operator 20 communicates 718 a fixed code and a rolling code to the trained transmitter 26 via the second communication protocol. The movable barrier operator 20 provides 720 a notification to the user 702 that the trained transmitter 26 is ready, such as by flashing one or more lights of the movable barrier operator 20.

In one embodiment, the method 700 includes the user 702 receiving 722 instructions to train the learning transmitter 26. For example, the user 702 may retrieve an instruction sheet from a container associated with the movable barrier operator 20. As another example, the user 702 may receive 722 the instructions (e.g., a portable document format file) by using a user device to retrieve the instructions from a website of the manufacturer of the movable barrier operator 20. As another example, the movable barrier operator 20 outputs a pre-recorded audio message from a speaker of the user interface 21 after or concurrent with the notification provided at operation 720.

The user 702 provides 726 a user input to the learning transmitter 28 that causes the learning transmitter to enter a learning mode. The user 702 also provides 724 a user input to the trained transmitter 26, such as by pressing the button of the trained transmitter 26 that the user 702 previously pressed at operation 710. The user input to the trained transmitter 26 causes the trained transmitter 26 to send a transmission 728 using the first communication protocol. The transmission 728 includes an access code having the fixed code and the rolling code received from the movable barrier operator 20 at operation 718.

The learning transmitter 28 receives the transmission 728 and determines 730 one or more codes of the access code of the transmission 728. For example, the determining 730 may include the learning transmitter 28 decrypting and parsing the access code of the transmission 728 for the fixed code and the rolling code of the access code. The learning transmitter 28 derives a fixed code and derives a rolling code from the access code of the transmission 728.

Next, the user 702 provides 731 a user input to the learning transmitter 28 to cause the learning transmitter 28 to send, using the first communication protocol, a transmission 732 to the movable barrier operator 20 that includes the derived fixed code and the derived rolling code. The movable barrier operator 20 receives the transmission 732 and stores the derived fixed code and the derived rolling code in the memory 74 of the movable barrier operator 20 to learn the learning transmitter 28.

The user 702 is prompted to provide 734 another user input to the learning transmitter 28, such as pressing the same button the user previously requested be learned by the movable barrier operator 20 at operation 726. In response to the user input, the learning transmitter 28 sends a transmission 736 to the movable barrier operator 20 using the first communication protocol. The transmission 736 includes the derived fixed code and a changing code incremented from the derived changing code. The incremented changing code may be, for example, the next roll value according to a rolling code algorithm employed by the movable barrier operator 20 and the learning transmitter 28.

The movable barrier operator 20 authenticates the rolling code and the incremented changing code of the transmission 736 and provides 738 an indication to the user 702 that the learning transmitter 28 has been learned by the movable barrier operator 20. The movable barrier operator 20 sends 740 a command to the trained transmitter 26 to exit the legacy training mode. The trained transmitter 26 reverts back to the operating mode wherein the trained transmitter 26 communicates with the movable barrier operator 20 using the second communication protocol. The trained transmitter 26 may exit 742 the legacy training mode after a predetermined period or duration of time, such as after five minutes if the trained transmitter 26 is still in the legacy training mode. Further, the trained transmitter 26 may exit 744 the legacy training mode after a predetermined number of button presses, such as five button presses, if the trained transmitter 26 is still in the legacy training mode.

Figure 8:
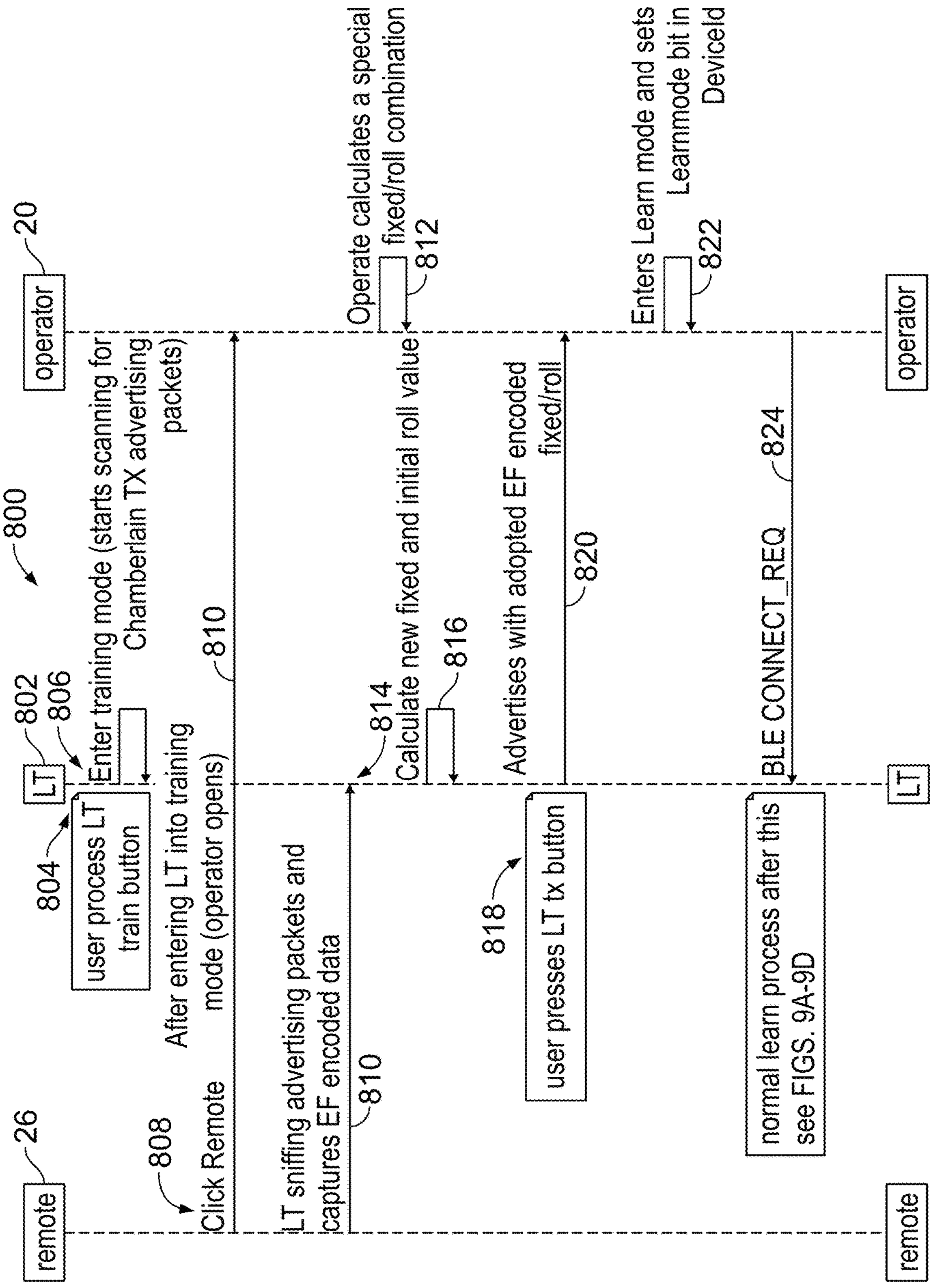
FIG. 8 is a flow diagram of a sixth example method of facilitating learning of a learning transmitter by a movable barrier operator.

Regarding FIG. 8, an example method 800 is provided that facilitates the operator 20 learning a learning transmitter 800 without the user having to press a learn button of the movable barrier operator 20. The method 800 utilizes the trained transmitter 26 and a learning transmitter 802. The learning transmitter 802 may be, for example, a learning transmitter integrated in a dashboard, visor, rearview mirror, or other location of a vehicle. As further examples, the learning transmitter 802 may be a transmitter associated with a set of keys or a transmitter that clips to a visor of a vehicle. Unlike in the previously-described examples, the present learning transmitter 802 is capable of communicating via the second communication protocol utilized by the operator 20 and the remote 26.

Initially, the user provides 804 a user input that causes the learning transmitter 800 to enter a learning mode and identifies a button of the learning transmitter 802 the user wants to be learned by the movable barrier operator 20. In the learning mode, the learning transmitter 802 scans for advertising packets from the trained transmitter 26.

The user provides 808 a user input to the trained transmitter 26, such as by pressing a previously learned button of the trained transmitter 26. The user provides 808 the user input within a predetermined time, such as within five seconds, of the user providing 804 the user input to the learning transmitter 802. In response to receiving the user input 808, the trained transmitter 26 transmits an advertisement 810 that is received 814 by the learning transmitter 802 and also substantially contemporaneously by the operator 20 (as will be discussed hereinafter).

The learning transmitter 28 determines one or more codes of the advertisement 810. For example, the learning transmitter 28 sniffs a packet of the advertisement, decrypts the packet, and parses the decrypted packet for a fixed code and a rolling code of the advertisement. Based on the fixed code and the rolling code of the transmission 810, the learning transmitter 802 derives or calculates 816 a new fixed code and an initial rolling code. The initial rolling code may be a next or subsequent rolling code that is expected by the operator 20. For example, the initial rolling code may be a newly determined rolling code based on the rolling code that partially constituted the transmission that was output by trained transmitter 26 relative to received user input 808.

The movable barrier operator 20 also receives the advertisement 810 as previously mentioned. The movable barrier operator 20 initiates a time window, such as 45 seconds, for the learning transmitter 802 to be learned. Next, the movable barrier operator 20 calculates 812 a fixed code and a rolling code that the movable barrier operator 20 expects to receive if a learning transmitter is to be learned during the time window. The calculation 812 is based at least in part on the fixed code and the rolling code of the transmission 810 from the trained transmitter 26.

The user provides 818 a user input to the learning transmitter 802, such as pressing the button to be learned, which causes the learning transmitter 802 to transmit 820 an advertisement including the new fixed code and initial rolling code calculated at operation 816.

The movable barrier operator 20 receives the transmission 820 and performs an operation 822 in which the operator 20 enters a learning mode when the transmission 820 is received within the predetermined time window or duration that was previously initiated (e.g. upon receipt by the operator 20 of the broadcast communication 810 from trained transmitter 26). The movable barrier operator 20 during performance of operation 822 also sets a "learnmode bit" (e.g. a specific, predetermined bit value) in the Device ID of the movable barrier operator 20 to indicate that the movable barrier operator 20 is in the learning mode. The movable barrier operator 20 communicates 824 a connection request to the learning transmitter 802. The communication 824 initiates a learning method 1400 discussed hereinafter with reference to FIGS. 9A, 9B.

Figure 9A:
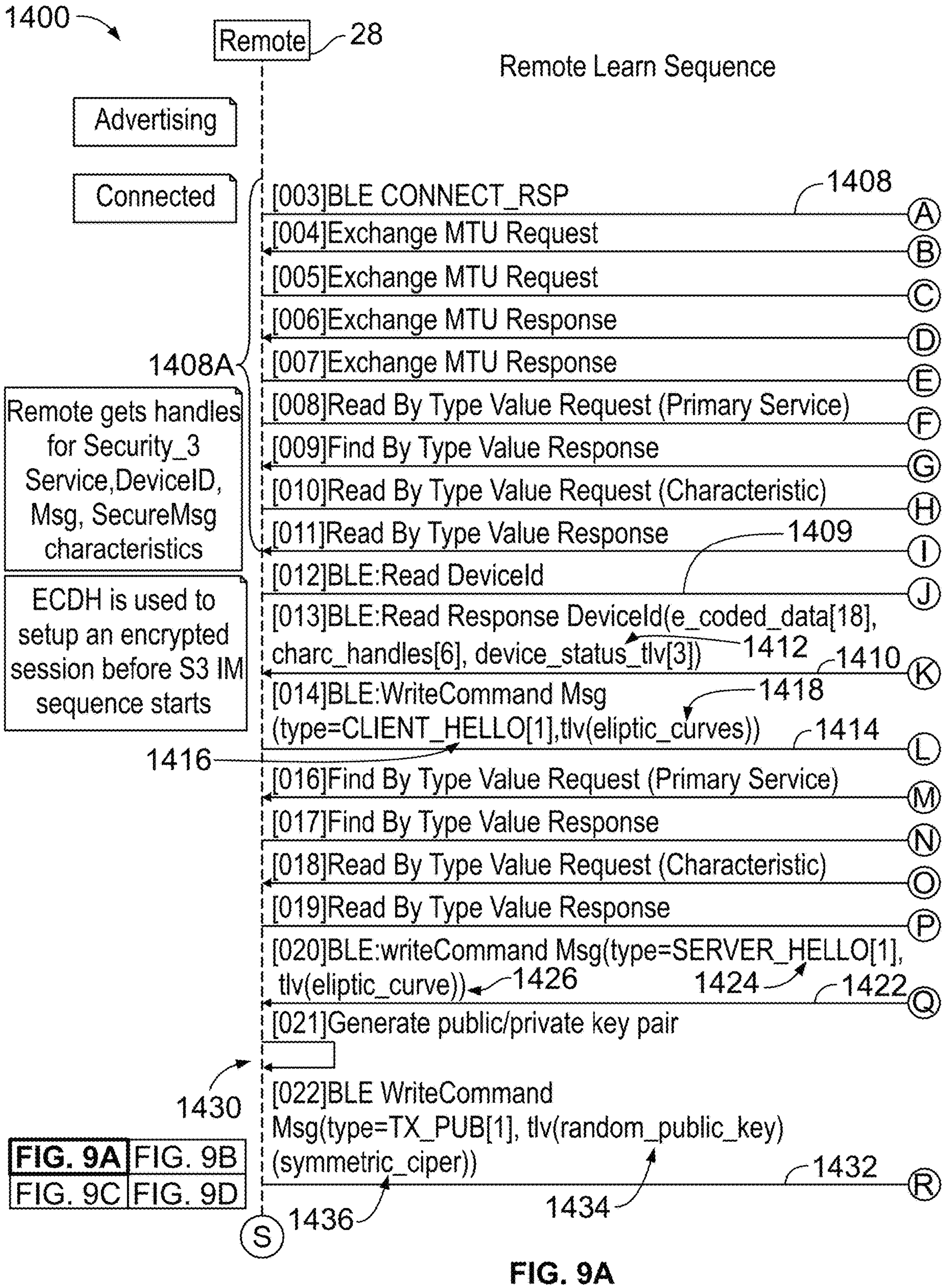
FIGS. 9A, 9B, 9C, and 9D illustrate a flow diagram showing an example communication flow between a learning transmitter and a movable barrier operator.
Figure 9B:
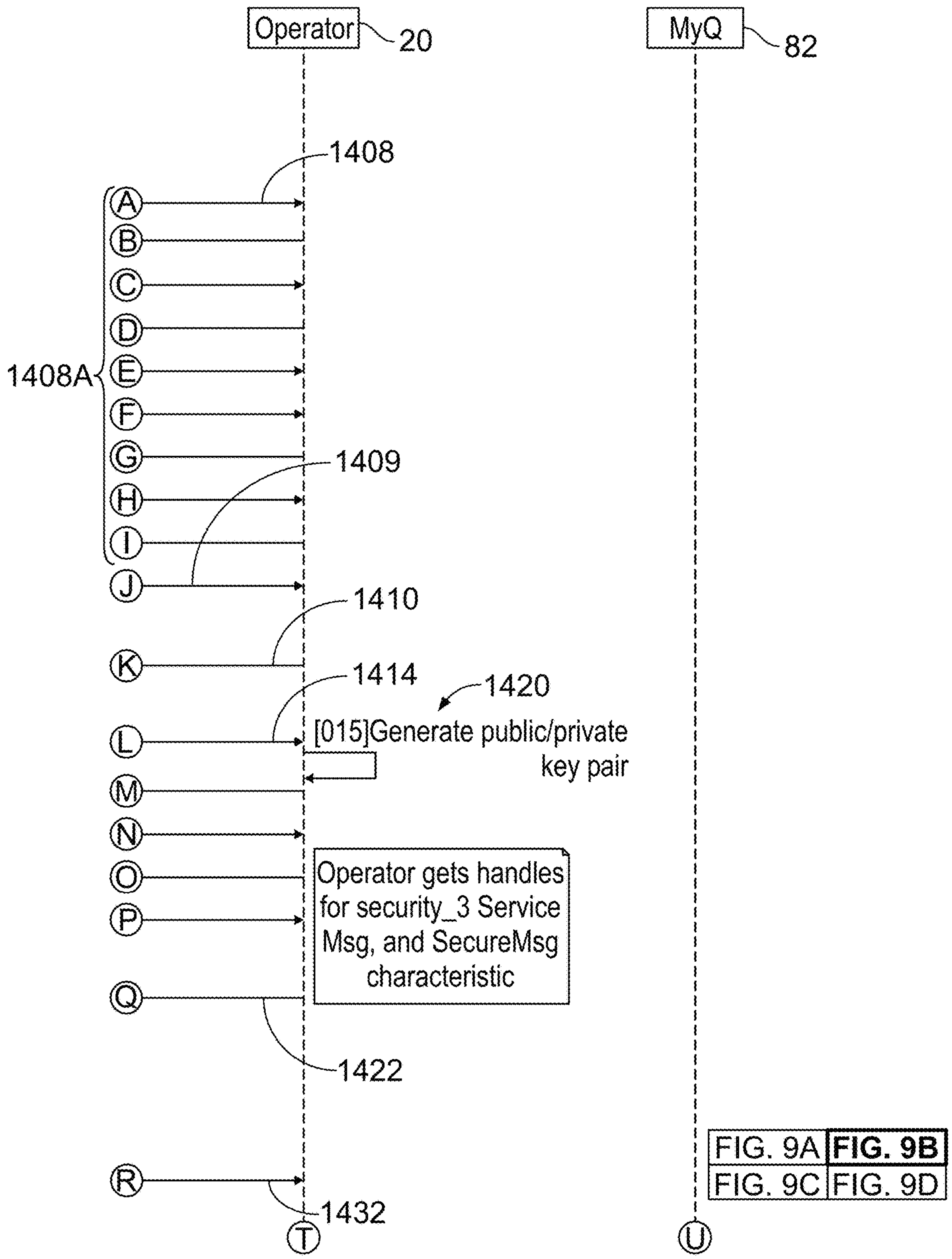
Figure 9C:
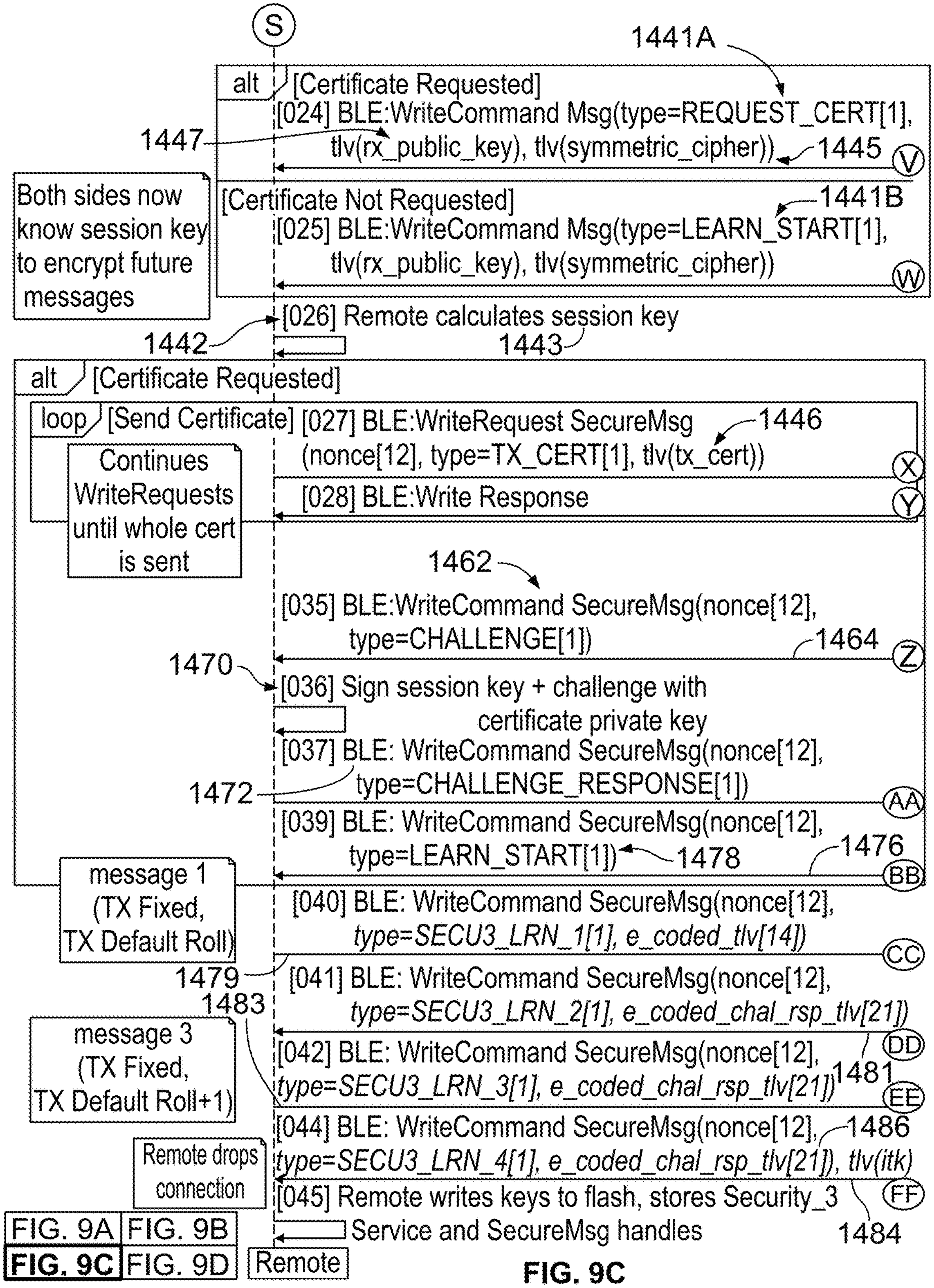
Figure 9D:
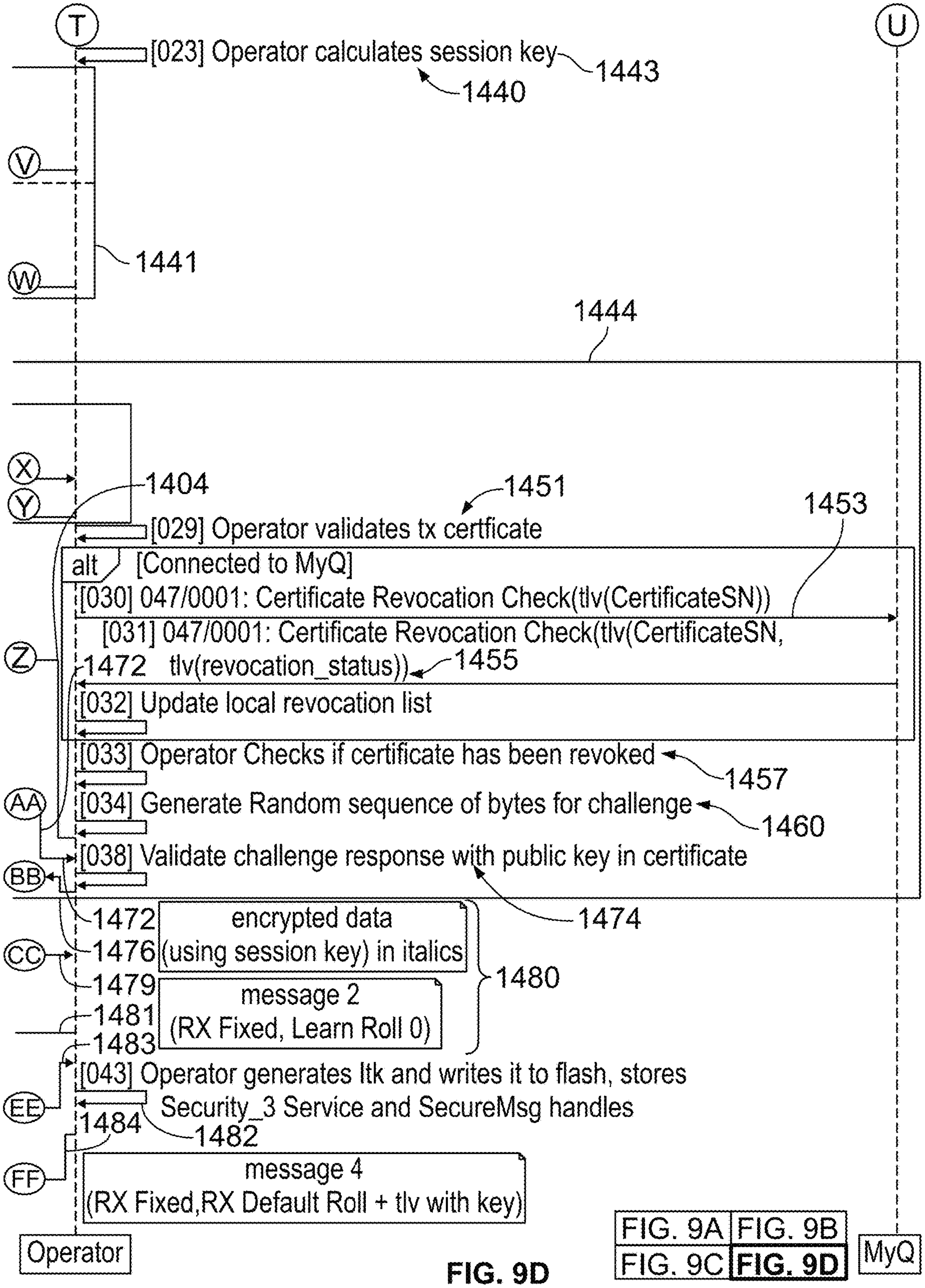

With reference to FIGS. 9A, 9B, example communications between a learning transmitter 28, such as a transmitter, and a movable barrier operator 20, such as a movable barrier operator, during a learning method 1400 are provided. The method 1400 utilizes asymmetric key cryptography to encrypt the learning process between the learning transmitter 28 and movable barrier operator 20. The asymmetric key cryptography includes the learning transmitter 28 and movable barrier operator 20 each generating a random public/private key pair and calculating a temporary shared secret session key. The session key is used during an authentication procedure of the method 1400 wherein the movable barrier operator 20 authenticates the learning transmitter 28. The session key is also used during a learning procedure of the method 1400 wherein the movable barrier operator 20 learns the fixed code and changing code of the learning transmitter 28 via a bidirectional communication protocol. Once the movable barrier operator 20 has learned the learning transmitter 28, the movable barrier operator 20 calculates and communicates a long-term key 1484 to the learning transmitter 28. The long-term key 1484 is used for subsequent communications between the learning transmitter 28 and movable barrier operator 20, such as when the learning transmitter 28 communicates a state change request to the movable barrier operator 20.

The method 1400 includes the learning transmitter 28 communicating 1408 a response to the connection request 824 (see FIG. 8) from the movable barrier operator 20. The learning transmitter 28 and movable barrier operator 20 establish 1408 a wireless connection between the learning transmitter 28 and the movable barrier operator 20 using the second communication protocol. In one embodiment, the second communication protocol includes utilizing a Bluetooth Low Energy (BLE) protocol.

The learning transmitter 28 communicates 1409 a Device ID of the learning transmitter 28 to the movable barrier operator 20. The movable barrier operator 20 communicates 1410 a message including the Device ID of the movable barrier operator 20 and the device status 1412 of the movable barrier operator 20 to the learning transmitter 28. The learning transmitter 28 reads the device status 1412 to determine if the movable barrier operator 20 is in a learn mode. If the movable barrier operator 20 is in the learn mode, the learning transmitter 28 communicates 1414 a message including a client hello message 1416 and an indication 1418 of the public/private key algorithm the learning transmitter 28 supports, such as an indication of the elliptic curves the learning transmitter 28 supports for an elliptical curve Diffie-Hellman (ECDH) algorithm.

The movable barrier operator 20 utilizes the indication 1418 to select the elliptic curve Diffie-Hellman algorithm to be used in the learning process and generates 1420 a random public/private key pair. The movable barrier operator 20 communicates 1422 a message including a server hello message 1424 and an indication 1426 of the elliptic curve that the movable barrier operator 20 selected.

The learning transmitter 28 generates 1430 a public/private key pair using the elliptic curve selected by the movable barrier operator 20. The learning transmitter 28 communicates 1432 the public key 1434 and a list 1436 of ciphers the learning transmitter 28 will support.

The ECDH algorithm is used by both the learning transmitter 28 and the movable barrier operator 20 to securely generate a temporary shared secret session key. The movable barrier operator 20 calculates the session key using the generated public key of the movable barrier operator 20, the generated secret key of the movable barrier operator 20, the public key of the learning transmitter 28, and the list 1436 of ciphers supported by the learning transmitter 28. The movable barrier operator 20 selects one of the ciphers from the list 1436.

With reference to FIG. 9B, the movable barrier operator 20 sends a communication 1441 including the public key 1447 of the movable barrier operator 20 and an indication 1445 of the symmetric cipher the movable barrier operator 20 has selected from the list 1436 of ciphers from the learning transmitter 28.

The communication 1441 includes a certificate request message 1441A to initiate a certificate verification process. In some situations, the movable barrier operator 20 may not authenticate the certificate of the learning transmitter 28 and instead sends a learn start message 1441B. The learn start message 1441B causes the learning transmitter 28 to initiate a learning mode sequence 1480.

The learning transmitter 28 calculates 1442 the session key using the generated public key of the learning transmitter 28, the generated secret key of the learning transmitter 28, the public key 1447 of the movable barrier operator 20, and the indication 1445 of the selected symmetric cipher.

Using a random public/private pair allows for a session key 1443 to be calculated at operations 1440, 1442 that is unique even if the movable barrier operator 20 is learning a learning transmitter 28 from which the movable barrier operator 20 has previously received communications. In one embodiment, the session key 1443 is calculated at operations 1440, 1442 via a SHA-256 function.

The method 1400 includes an authentication operation 1444 wherein the learning transmitter 28 communicates a certificate 1446 to the movable barrier operator 20 and the movable barrier operator 20 validates the certificate 1446 including comparing 1451 the certificate 1446 to a list of revoked certificates. In some embodiments, if the movable barrier operator 20 is able to communicate with the server computer 82, the movable barrier operator 20 queries 1453 the server computer 82 for an updated list of revoked certificates. The server computer 82 responds 1455 with the updated list of revoked certificates and the movable barrier operator 20 saves the updated list of revoked certificates in the local memory 74. The movable barrier operator checks 1457 whether the certificate 1446 of the learning transmitter 28 is in the list of revoked certificates.

If the certificate 1446 of the learning transmitter 28 is not in the list of revoked certificates, the movable barrier operator 20 generates 1460 a challenge 1462, such as random data, and communicates 1464 the challenge 1462 to the learning transmitter 28.

The learning transmitter has a certificate private key and a certificate public key that are generated by middleware (e.g., server computer 82) when the middleware generates the certificate 1446 for the learning transmitter 28. The certificate 1446, which includes the certificate public key, and the certificate private key are seeded in the learning transmitter 28 such as during manufacture of the learning transmitter 28.

To respond to the challenge from the movable barrier operator 20, the learning transmitter 28 concatenates the session key with the random data and signs the output of the concatenation with a certificate private key of the learning transmitter. The learning transmitter 28 communicates 1472 the challenge response to the movable barrier operator 20.

The movable barrier operator 20 validates 1474 the challenge response. In one approach, the validation 1474 includes the movable barrier operator 20 utilizing an elliptic curve digital signature algorithm (ECDSA) verification operation in conjunction with the public key in the certificate 1446 of the learning transmitter 20, the challenge data the movable barrier operator 20 sent to the learning transmitter 28, and the session key.

The challenge-response procedure permits the movable barrier operator 20 to prove to itself that there is not a malicious actor intercepting communications between the learning transmitter 28 and movable barrier operator 20. Specifically, the movable barrier operator 20 determines the learning transmitter 28 is the owner of the certificate 1446 the movable barrier operator 20 received. Proving ownership of the certificate 1446 is accomplished by performing an operation that proves the learning transmitter 28 has the private key associated with the certificate 1446 the movable barrier operator 20 received. The operation includes having the learning transmitter 28 sign the session key concatenated with the random data of the challenge from the movable barrier operator 20 and the learning transmitter 28 sending the output of the signing operation back to the movable barrier operator 20. If there was a malicious actor intercepting communications between the learning transmitter 28 and movable barrier operator 20, there would be two session keys. The first session key would be between the learning transmitter 28 and the malicious actor and the second session key would be between the movable barrier operator 20 and the malicious actor. The two session keys would be different since the session keys are calculated based on the public/private key pairs randomly generated by the devices. Because the session key is calculated by each side and not sent over the air, the learning transmitter 28 will not know the second session key and the movable barrier operator 20 will not know the first session key. Therefore, even if the malicious actor forwarded the challenge request from the movable barrier operator 20 to the learning transmitter 28, the learning transmitter 28 would send a challenge response different than the challenge response expected by the movable barrier operator 20 and the validation 1474 would be unsuccessful. More specifically, the learning transmitter 28 would send a challenge response signed using the first session key while the movable barrier operator 20 is expecting a challenge key signed using the second session key.

If the validation 1474 is successful, the movable barrier operator 20 communicates 1476 a learn start message 1478 to cause the learning transmitter 28 to initiate the learning message sequence 1480. The learning transmitter 28 sends a communication 1479 including a fixed code and a rolling code.

The movable barrier operator 20 sends a communication 1481 including a fixed code and a rolling code with a value that indicates the movable barrier operator is learning the learning transmitter 28. For example, the rolling code in the communication 1481 may have a value of zero to indicate that the movable barrier operator 20 is in the learning mode.

The learning transmitter 28 sends a communication 1483 including the fixed code and a rolling code that has been incremented from the rolling code sent in communication 1479.

At operation 1482, the movable barrier operator 20 confirms that the incremented rolling code received in communication 1483 are the expected values based on the rolling code algorithm utilized by both the movable barrier operator 20 and the learning transmitter 28. If the learning message sequence 1480 is successful, the movable barrier operator 20 generates a long-term key 1484 at operation 1482.

The movable barrier operator 20 communicates 1486 the long-term key 1484 to the learning transmitter 28. The learning transmitter 28 and movable barrier operator 20 thereafter utilize the long-term key 1484 to encrypt and decrypt communications between the learning transmitter 28 and movable barrier operator 20.

Once the movable barrier operator 20 has learned the learning transmitter 28, any command from one of the learning transmitter 28 and movable barrier operator 20 to the other of the learning transmitter 28 and movable barrier operator 20 involves communication session constituted by a sequence of bidirectional communication messages. Further, the bidirectional communication message sequence is encrypted using the long-term key 1484 calculated by the movable barrier operator 20 and provided to the learning transmitter 28 in communication 1486.

One issue with existing learning transmitters is that a user may use a trained transmitter to cause a movable barrier operator to learn multiple transmitters such as trainable transceivers/transmitters or universal transceivers/transmitters. The multiple transmitters each derive a fixed code and a rolling code from the trained transmitter. The user is only limited by the total number of transmitters supported by the movable barrier operator. This is particularly problematic in some gated communities, where facility managers provide a resident with a transmitter having a credential associated with the resident. If the resident uses the supplied transmitter to train learning transmitters that are not associated with the resident, e.g., in-vehicle transmitters of relatives or friends, the movable barrier operator will incorrectly associate a request for access by one of the trained learning transmitters as being sent by the resident user. Further, it may also be difficult to identify and revoke access credentials of a resident's transmitters when the resident moves out of the gated community.

Figure 10A:
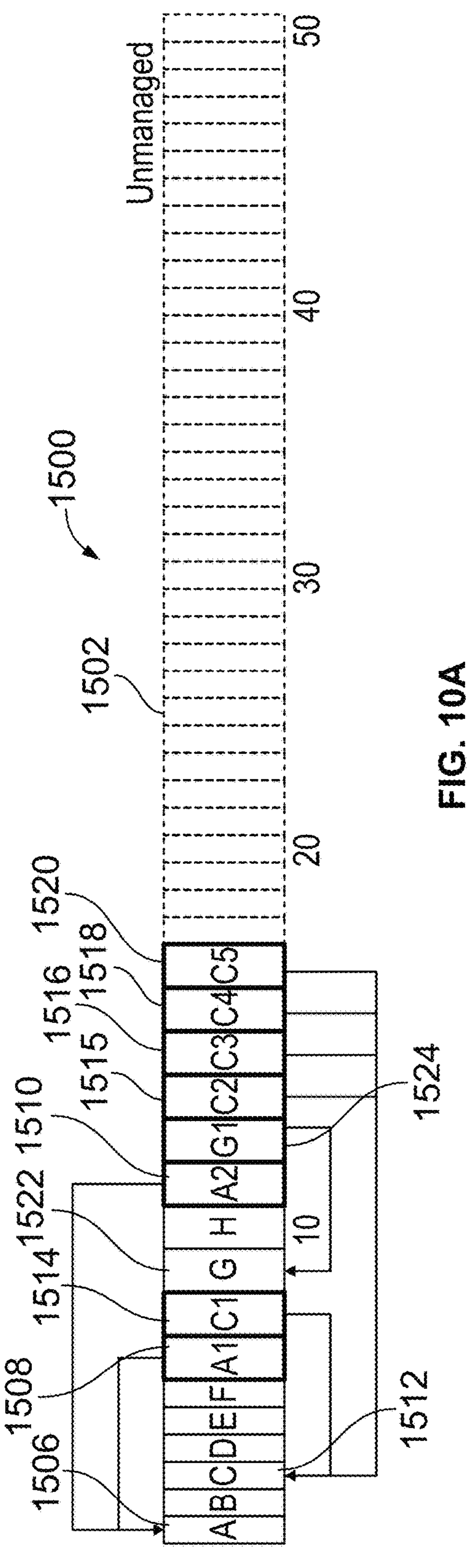
FIG. 10A is a schematic representation of example memory locations of a movable barrier operator showing memory locations occupied by data of learning transmitters C1-C5 that were trained using trained transmitter C.

A method 1549 of managing identifying data for transmitters associated with a movable barrier is provided below that facilitates autonomous management of the transmitter access credentials. With reference to FIG. 10A, an example data array 1500 is provided having memory locations 1502 that receive identifying data of transmitters. The identifying data may include, for example, a fixed code, a changing code, transmitter type data, and/or switch ID data for a transmitter. The memory locations 1502 of the data array 1500 include unoccupied or available memory locations 1503A, memory locations 1503B containing identifying data of trained transmitters that have been learned by the movable barrier operator, and memory locations 1503C storing identifying data of learning transmitters that have been learned by the movable barrier operator.

As shown in FIG. 10A, the "A" trained transmitter 1506 may be used to train the movable barrier operator to recognize the A1, A2 learning transmitters 1508, 1510. Similarly, another user may use the "C" trained transmitter 1512 to train the movable barrier operator to recognize the C1-C5 learning transmitters 1514, 1515, 1516, 1518, 1520. Still further, another user may use the "G" trained transmitter 1522 to train the movable barrier operator to recognize the G1 learning transmitter 1524.

Figure 10B:
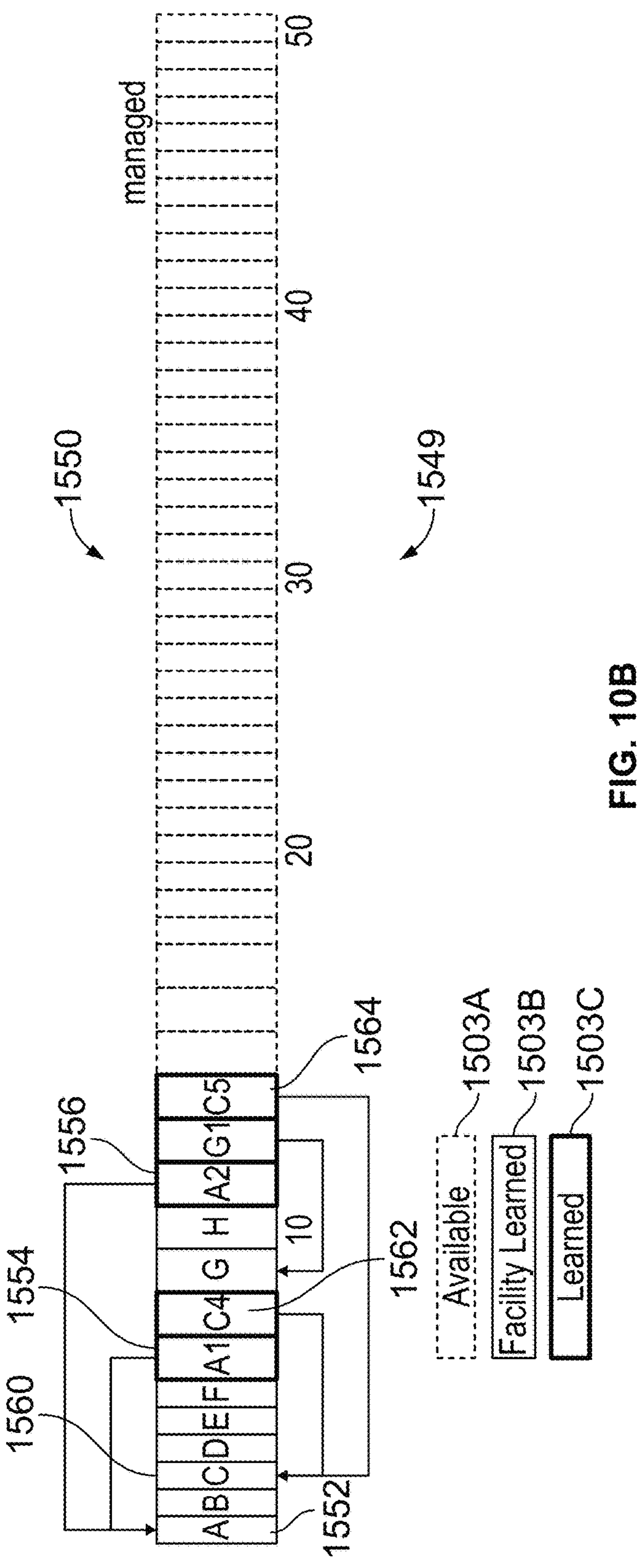
FIG. 10B is a schematic view similar to FIG. 10A except that the data of learning transmitter C1 has been erased from a memory location in response to the movable barrier operator learning transmitter C3 and the data of learning transmitter C2 and C3 have been erased from memory locations in response to the movable barrier operator learning transmitters C4 and C5.

To limit the number of memory locations learning transmitters may occupy in a data array of a memory (e.g. the previously mentioned whitelist 90 shown in FIG. 2) of a movable barrier operator, the processor of the movable barrier operator may be configured to utilize the method 1549 to limit the number of learning transmitters that have been trained using the trained transmitter to a predetermined number. With reference to FIG. 10B, the data array 1550 stores identifying information for the "A" trained transmitter 1552 and A1, A2 learning transmitters 1554, 1556. If a user were to attempt to use the "A" trained transmitter 1552 to train the movable barrier operator to recognize another learning transmitter (e.g., A3), the movable barrier operator may provide to the server computer a message that the user is attempting to train more than two learning transmitters. The movable barrier operator may decline the attempt (e.g. based on learning rules implemented at the server and/or movable barrier operator wherein such rules restrict or limit a number/quantity of learning or universal transmitters/transceivers to be derived from a known transmitter) and inhibit the user from training the movable barrier operator to recognize the third learning transmitter.

In another embodiment, the processor utilizes a first-in, first-out approach to limit the number of learning transmitters learned by the movable barrier operator. For example, the "C" trained transmitter 1560 was previously used to train the movable barrier operator to recognize C1 and C2 learning transmitters. The user associated with the "C" trained transmitter 1560 used the "C" trained transmitter 1560 to train the movable barrier operator recognize a new C3 learning transmitter. The movable barrier operator, in response to learning the C3 learning transmitter, acts to maintain a predefined number of C-related transmitters by removing the C1 learning transmitter from the data array 1550.

Next, the user associated with the "C" trained transmitter 1560 used the "C" trained transmitter to train the movable barrier operator to recognize C4 and C5 learning transmitters. The movable barrier operator, in response to learning C4 and C5, proceeds to remove the C2 and C3 learning transmitters from the data array 1550 such that the movable barrier operator stores the identifying data of the predefined quantity/number (e.g. three) for the C and the C4 and C5 transmitters 1562, 1564 in the data array 1550.

With continued reference to FIG. 10B, the user associated with the "G" trained transmitter used the "G" trained transmitter to train the movable barrier operator to recognize G1 and G2 learning transmitters. The user associated with the "G" trained transmitter subsequently used the "G" trained transmitter to train the movable barrier operator to recognize control signals from G3, G4, and G5 learning transmitters. The movable barrier operator removed the identifying data for the G3 learning transmitter as part of learning the G4 learning transmitter, and likewise removed the identifying data for the G4 learning transmitter as part of learning the G5 learning transmitter. The first-in, first-out approach is provided for each trained transmitter to limit the number of memory locations that may be occupied by learning transmitters associated with each of the transmitters trained by the facility.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A method of training a trainable transmitter, the method comprising:

transmitting, from a controllable device to a remote control previously learned by the controllable device, a first radio frequency communication via a first communication protocol, the first radio frequency communication including an access code;

transmitting, from the remote control to a trainable transmitter, a second radio frequency communication via a second communication protocol different than the first communication protocol, the second radio frequency communication including the access code;

determining, by the trainable transmitter, a derived access code based at least in part upon the access code of the second radio frequency communication;

transmitting, from the trainable transmitter to the controllable device, a third radio frequency communication via the second communication protocol, the third radio frequency communication including the derived access code; and learning, by the controllable device, the trainable transmitter in response to correspondence between the derived access code and the access code.

2. The method of claim 1 wherein transmitting, from the controllable device to the remote control, the first radio frequency communication comprises:

transmitting, from the controllable device to the remote control, a command radio frequency communication configured to cause the remote control to change from an operating mode to a training mode; and transmitting, from the controllable device to the remote control, an access code radio frequency communication including the access code.

3. The method of claim 2 further comprising communicating a message to a user device upon the controllable device transmitting the access code radio frequency communication to the remote control, the message configured to cause the user device to prompt a user to provide a user input to user interfaces of the remote control and the trainable transmitter.

4. The method of claim 1 wherein the first radio frequency communication is configured to cause the remote control to change from an operating mode to a training mode, wherein the remote control in the operating mode is configured to communicate using the first communication protocol, and wherein the remote control in the training mode is configured to communicate using the second communication protocol.

5. The method of claim 1 further comprising at least one of:

transmitting, from the controllable device to the remote control, an exit command in response to the controllable device learning the trainable transmitter, the exit command configured to cause the remote control to change from a training mode to an operating mode; and changing the remote control from the training mode to the operating mode in response to a predetermined amount of time elapsing.

6. The method of claim 1 wherein the access code includes a first fixed code and a first changing code, the first fixed code identifying the remote control;

wherein determining the derived access code includes deriving a second fixed code from the first fixed code and deriving a second changing code from the first changing code, the second fixed code identifying the trainable transmitter; and wherein learning the trainable transmitter includes learning the trainable transmitter in response to:

the second fixed code corresponding to the first fixed code; and the second changing code corresponding to the first changing code.

7. The method of claim 1 further comprising transmitting, from the remote control to the controllable device, an authentication radio frequency communication via the first communication protocol; and wherein transmitting, from the controllable device to the remote control, the first radio frequency communication comprises transmitting the first radio frequency communication in response to the controllable device receiving the authentication radio frequency communication.

8. The method of claim 1 wherein the controllable device comprises a movable barrier operator, the method further comprising:

transmitting, from a wall control to the movable barrier operator, a command to enter a learn mode;

prompting, by the wall control, a user to provide a user input to the remote control; and transmitting, from the remote control to the movable barrier operator, an authentication radio frequency communication via the first communication protocol.

9. The method of claim 1 wherein the controllable device comprises a movable barrier operator, the method further comprising:

entering, by the movable barrier operator, a learn mode in response to receiving a first user input at a user interface of the movable barrier operator; and flashing a light of the movable barrier operator to prompt a user to provide another user input to the remote control.

10. The method of claim 1 wherein the access code comprises a first fixed code and a first changing code, wherein the first fixed code identifies the remote control; and wherein the derived access code comprises a second fixed code and a second changing code, wherein the second fixed code identifies the trainable transmitter.

11. The method of claim 1 further comprising receiving, by the controllable device, a learn mode command from a server computer; and wherein transmitting the first radio frequency communication comprises transmitting the first radio frequency communication in response to the controllable device receiving the learn mode command.

12. The method of claim 1 further comprising receiving, by a user device, a user input requesting learning of the trainable transmitter by the controllable device;

communicating, from the user device to a server computer, a request for the controllable device to learn the trainable transmitter; and communicating, from the server computer to the controllable device, a message configured to cause the controllable device to enter a learn mode.

13. The method of claim 1 wherein the controllable device includes a movable barrier operator, the method further comprising:

in response to the movable barrier operator learning the trainable transmitter, the movable barrier operator performing operations including at least one of:

flashing a light; and moving a movable barrier.

14. The method of claim 13 wherein the derived access code includes a fixed code and a changing code, the method further comprising:

transmitting, from the trainable transmitter to the movable barrier operator, a fourth radio frequency communication via the second communication protocol, the fourth radio frequency communication including the fixed code and a changed version of the changing code; and moving, by the movable barrier operator, the movable barrier in response to the movable barrier operator receiving the fourth radio frequency communication.

15. A system comprising:

a remote control comprising a remote control communication circuitry and a remote control controller, the remote control controller configured to:

receive through the remote control communication circuitry a first radio frequency communication via a first communication protocol, the first radio frequency communication including an access code;

control the remote control communication circuitry to transmit a second radio frequency communication via a second communication protocol, the second radio frequency communication including the access code;

a trainable transmitter having a trainable transmitter communication circuitry and a trainable transmitter controller, the trainable transmitter controller configured to:

receive through the trainable transmitter communication circuitry the second radio frequency communication;

determine a derived access code based at least in part upon the access code of the second radio frequency communication;

control the trainable transmitter communication circuitry to transmit a third radio frequency communication via the second communication protocol, the third radio frequency communication including the derived access code;

a controllable device comprising a controllable device communication circuitry and a controllable device controller, the controllable device controller configured to:

control the controllable device communication circuitry to transmit the first radio frequency communication including the access code;

receive through the controllable device communication circuitry the third radio frequency communication including the derived access code; and learn the trainable transmitter in response to correspondence between the derived access code of the third radio frequency communication and the access code of the first radio frequency communication.

16. The system of claim 15 wherein the controllable device controller is configured to control the controllable device communication circuitry to transmit the first radio frequency communication comprising:

transmitting a command radio frequency communication configured to cause the remote control to change from an operating mode to a training mode; and transmitting an access code radio frequency communication including the access code.

17. The system of claim 15 further comprising a server computer configured to:

receive, from a user device, a request for the controllable device to enter a learn mode;

communicate, to the controllable device, a command configured to cause the controllable device to enter the learn mode;

wherein the controllable device controller in the learn mode is configured to receive through the controllable device communication circuitry an authentication from the remote control; and wherein the controllable device controller is configured to control the controllable device communication circuitry to transmit the first radio frequency communication in response to the controllable device communication circuitry receiving the authentication from the remote control.

18. The system of claim 15 wherein the controllable device controller is configured to enter a learn mode in response to at least one of:

a user input at a user interface of the controllable device;

the controllable device communication circuitry receiving a learn mode command from a remote device; and wherein the controllable device controller in the learn mode is configured to receive through the controllable device communication circuitry an authentication from the remote control; and wherein the controllable device controller is configured to control the controllable device communication circuitry to transmit the first radio frequency communication in response to the controllable device communication circuitry receiving the authentication from the remote control.

19. The system of claim 15 wherein the trainable transmitter is unable to communicate via the first communication protocol.

20. The system of claim 15 wherein the access code comprises a first fixed code and a first changing code, the first fixed code identifying the remote control;

wherein the derived access code includes a second fixed code and a second changing code, the second fixed code identifying the trainable transmitter; and wherein the controllable device controller is configured to learn the trainable transmitter in response to the second fixed code corresponding to the first fixed code and the second changing code corresponding to the first changing code.

* * * * *